United States Patent
Holzwanger et al.

(10) Patent No.: US 9,976,782 B1
(45) Date of Patent: May 22, 2018

(54) PORTABLE INSTANT COOLING SYSTEM WITH CONTROLLED TEMPERATURE OBTAINED THROUGH TIMED-RELEASE LIQUID OR GASEOUS $CO_2$ COOLANT FOR GENERAL REFRIGERATION USE IN MOBILE AND STATIONARY CONTAINERS

(71) Applicants: Mark Holzwanger, Hewlett, NY (US); Xianghong Henry Liu, Ann Arbor, MI (US); Heng Hu, Plymouth, MN (US); Harry Holzwanger, Bayside, NY (US); Maria Grazia Verardi, Briarcliff Manor, NY (US); Robert A. Sailer, West Fargo, ND (US); Justin Hoey, Fargo, ND (US)

(72) Inventors: Mark Holzwanger, Hewlett, NY (US); Xianghong Henry Liu, Ann Arbor, MI (US); Heng Hu, Plymouth, MN (US); Harry Holzwanger, Bayside, NY (US); Maria Grazia Verardi, Briarcliff Manor, NY (US); Robert A. Sailer, West Fargo, ND (US); Justin Hoey, Fargo, ND (US)

(73) Assignees: Frostime LLC, New York, NY (US); NDSU Research Foundation, Fargo, ND (US)

( * ) Notice: Subject to any disclaimer, the term of this patent is extended or adjusted under 35 U.S.C. 154(b) by 0 days. days.

(21) Appl. No.: 15/382,716

(22) Filed: Dec. 18, 2016

(51) Int. Cl.
*G01K 13/00* (2006.01)
*F17C 13/00* (2006.01)
(Continued)

(52) U.S. Cl.
CPC ........... *F25B 19/005* (2013.01); *A61J 1/1468* (2015.05); *A61J 1/165* (2013.01); *B60H 1/3202* (2013.01);
(Continued)

(58) Field of Classification Search
CPC .... F25D 29/001; F25D 29/008; F25D 29/006; F25D 31/007; F25D 31/001; F25D 23/12;
(Continued)

(56) References Cited

U.S. PATENT DOCUMENTS 3,633,381 A * 1/1972 Haaf ................. F25D 3/107
62/222
4,054,037 A * 10/1977 Yoder ............... F25D 3/107
62/224
(Continued)

*Primary Examiner* — Frantz Jules
*Assistant Examiner* — Joseph Trpisovsky
(74) *Attorney, Agent, or Firm* — Thomas I. Rozsa

(57) ABSTRACT

Standalone and self-contained cooling systems using compressed liquid and/or gas $CO_2$ containers positioned in an insulated or non-insulated vessel and consisting of a specially designed unit where the containers are vertically positioned in an upright or upside-down position. The liquid and/or gas CO2 coolant is then released into capillary tube(s) embedded into a heat transfer plate or heat exchanger thus leveraging the $CO_2$ coolant properties. The temperature is controlled by a metering $CO_2$ releasing system encompassing an electronic control device which can be operated remotely and/or via a touch screen and which sends alerts when pre-defined thresholds are exceeded. The invention's metering $CO_2$ releasing system may be triggered by an electronic or a thermostatic valve or may be triggered manually or by an electronic solenoid. The invention's cooling system also encompasses check valves, which avoid liquid and/or gas $CO_2$ from escaping when removing or replacing $CO_2$ containers individually.

44 Claims, 35 Drawing Sheets

(51) Int. Cl.

| | |
|---|---|
| *F25D 19/00* | (2006.01) |
| *F25B 19/00* | (2006.01) |
| *B60H 1/32* | (2006.01) |
| *F25D 31/00* | (2006.01) |
| *F25C 1/04* | (2018.01) |
| *F25D 29/00* | (2006.01) |
| *F25D 17/02* | (2006.01) |
| *F25D 23/12* | (2006.01) |
| *F25D 23/02* | (2006.01) |
| *F25B 25/00* | (2006.01) |
| *G05D 23/02* | (2006.01) |
| *A61J 1/16* | (2006.01) |
| *A61J 1/14* | (2006.01) |
| *H04B 3/04* | (2006.01) |
| *H04L 29/06* | (2006.01) |

(52) U.S. Cl.
CPC .............. *F25B 25/005* (2013.01); *F25C 1/04* (2013.01); *F25D 17/02* (2013.01); *F25D 23/028* (2013.01); *F25D 23/12* (2013.01); *F25D 29/001* (2013.01); *F25D 29/006* (2013.01); *F25D 29/008* (2013.01); *F25D 31/007* (2013.01); *G05D 23/021* (2013.01); *H04B 3/04* (2013.01); *H04L 63/0428* (2013.01); *F25D 2400/36* (2013.01); *F25D 2600/02* (2013.01); *F25D 2700/10* (2013.01); *F25D 2700/12* (2013.01); *F25D 2700/14* (2013.01)

(58) Field of Classification Search
CPC ........ F25D 3/105; F25D 3/107; F25B 19/005; F25B 9/008; A61J 1/165; A61J 1/1468; F25C 1/04; F17C 2221/013; F17C 7/00; F17C 7/02
USPC ..................................... 62/129, 457.9, 457.1
See application file for complete search history.

(56) References Cited

U.S. PATENT DOCUMENTS

| | | | |
|---|---|---|---|
| 4,096,707 | A | 6/1978 | Taylor |
| 4,195,491 | A | 4/1980 | Roncaglione |
| 4,404,818 | A | 9/1983 | Franklin, Jr. |
| 4,640,101 | A * | 2/1987 | Johnson ................. F25D 3/107 62/294 |
| 5,125,237 | A * | 6/1992 | Saia, III ............... B60H 1/3226 62/239 |
| 5,845,499 | A * | 12/1998 | Montesanto ............. F17C 7/04 62/294 |
| 6,925,834 | B2 | 8/2005 | Fuchs |
| 7,386,995 | B2 | 6/2008 | Gomes et al. |
| 2012/0138848 | A1 | 6/2012 | Leavitt et al. |

* cited by examiner

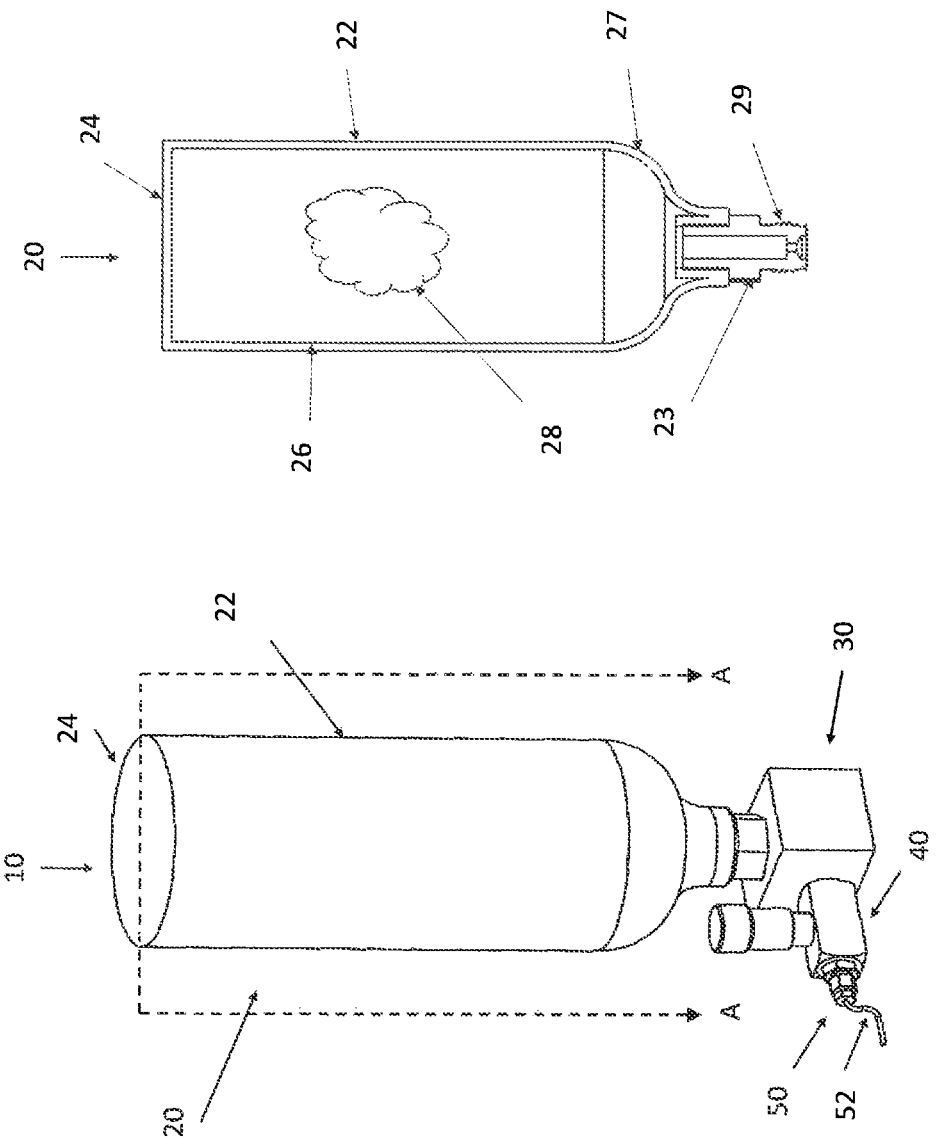

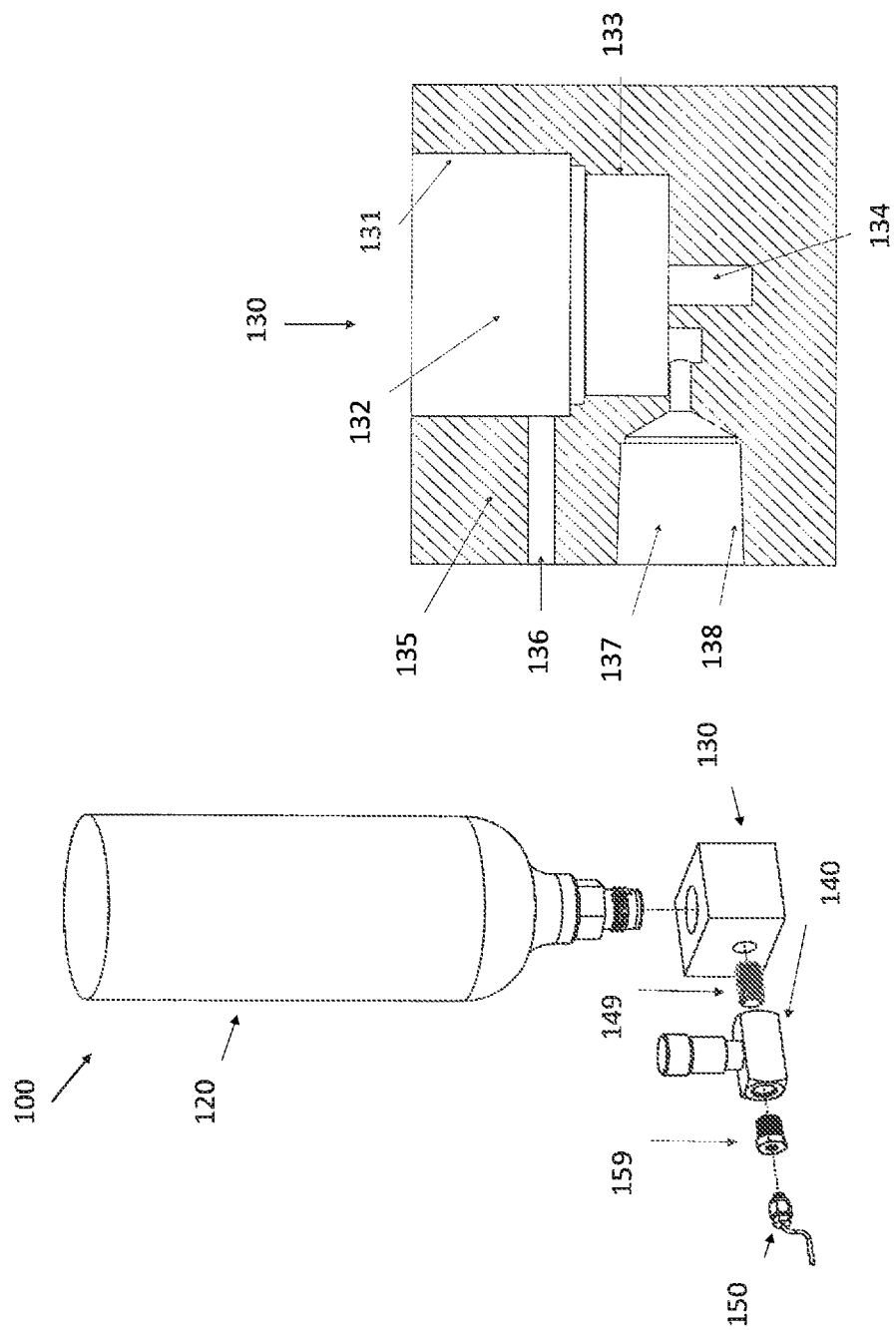

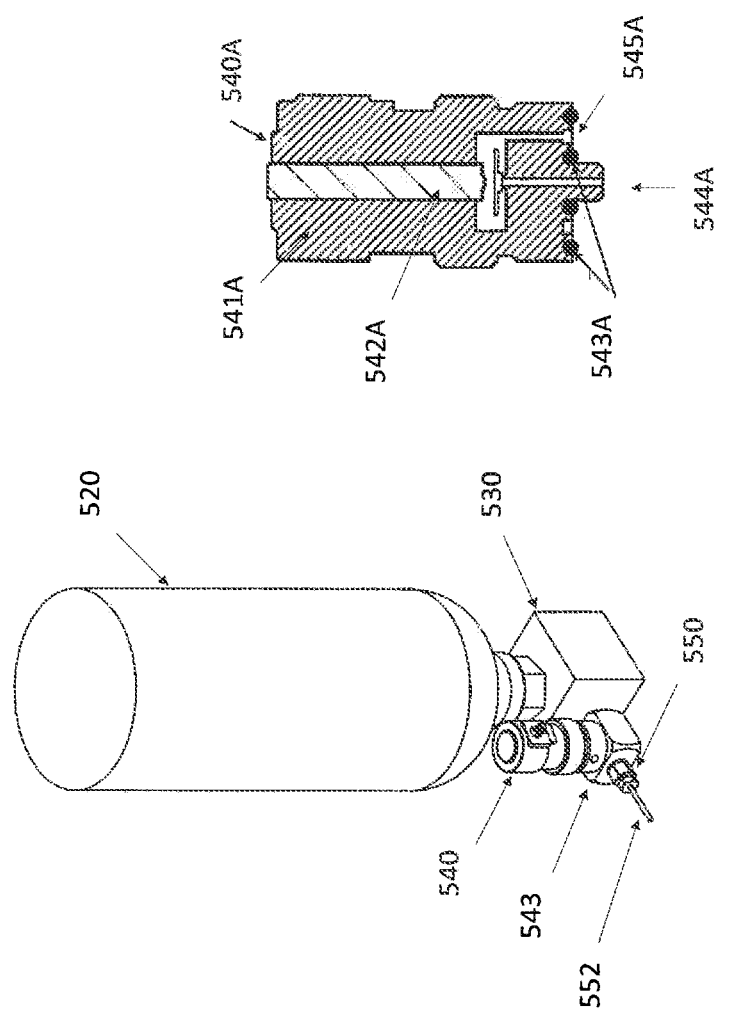

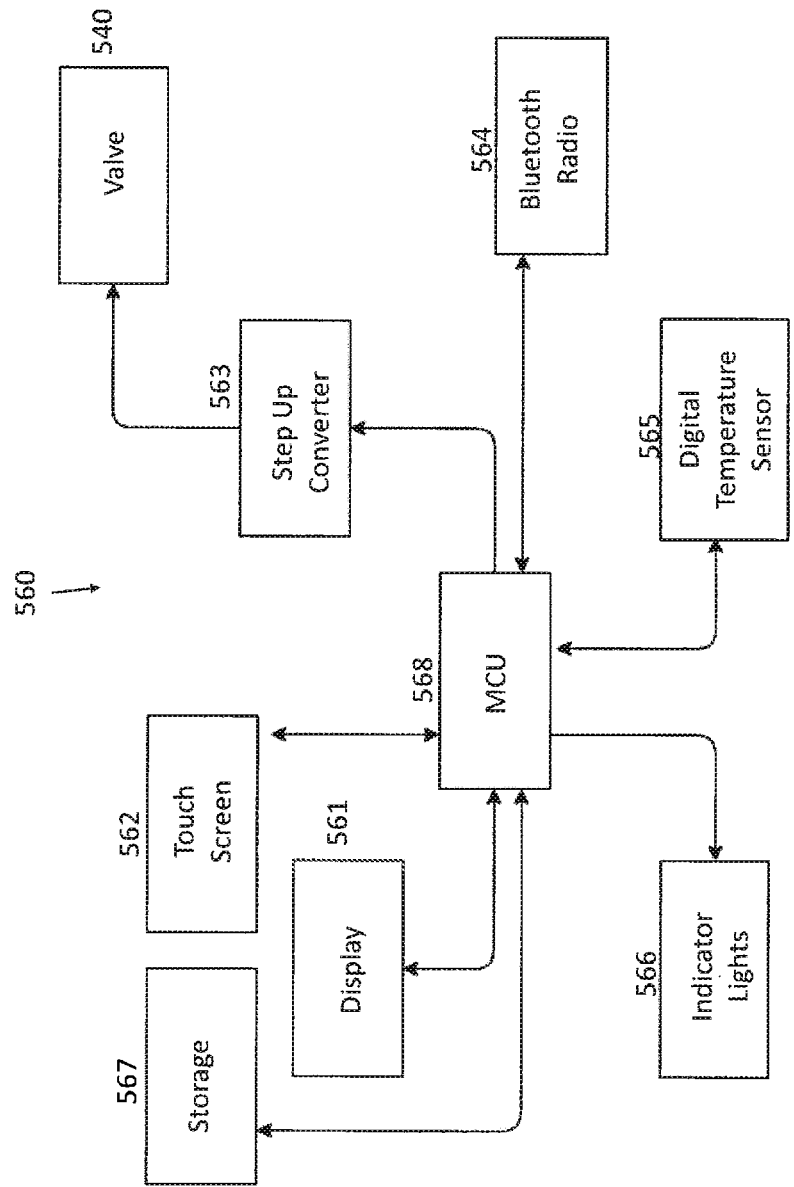

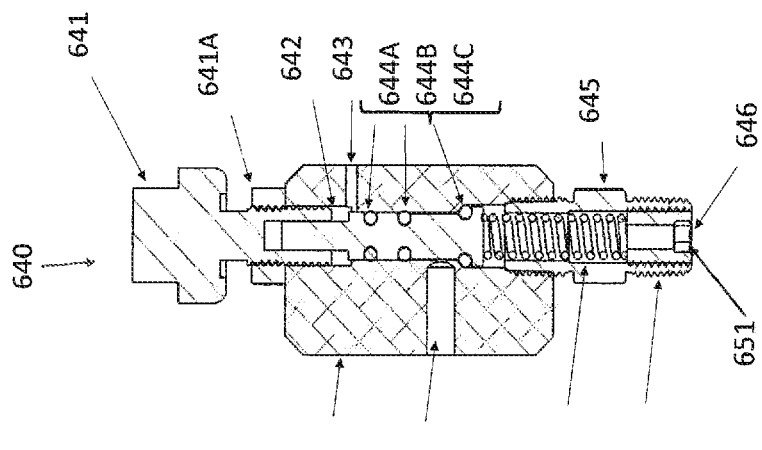
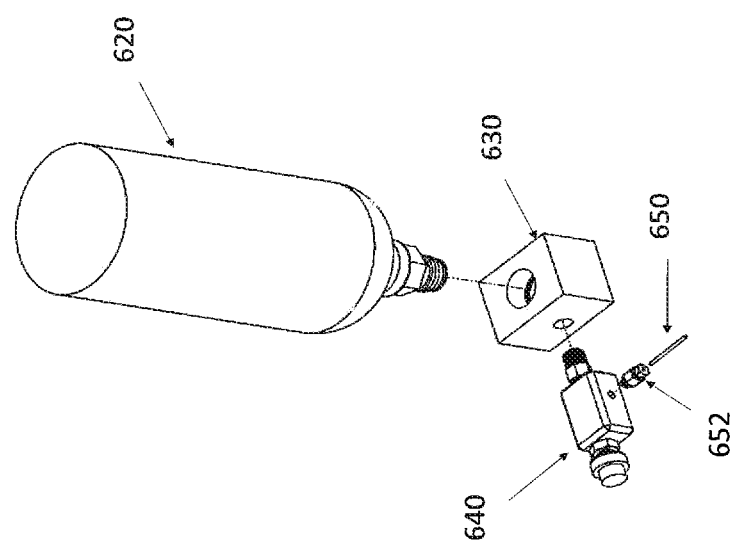
FIG. 6A
FIG. 6

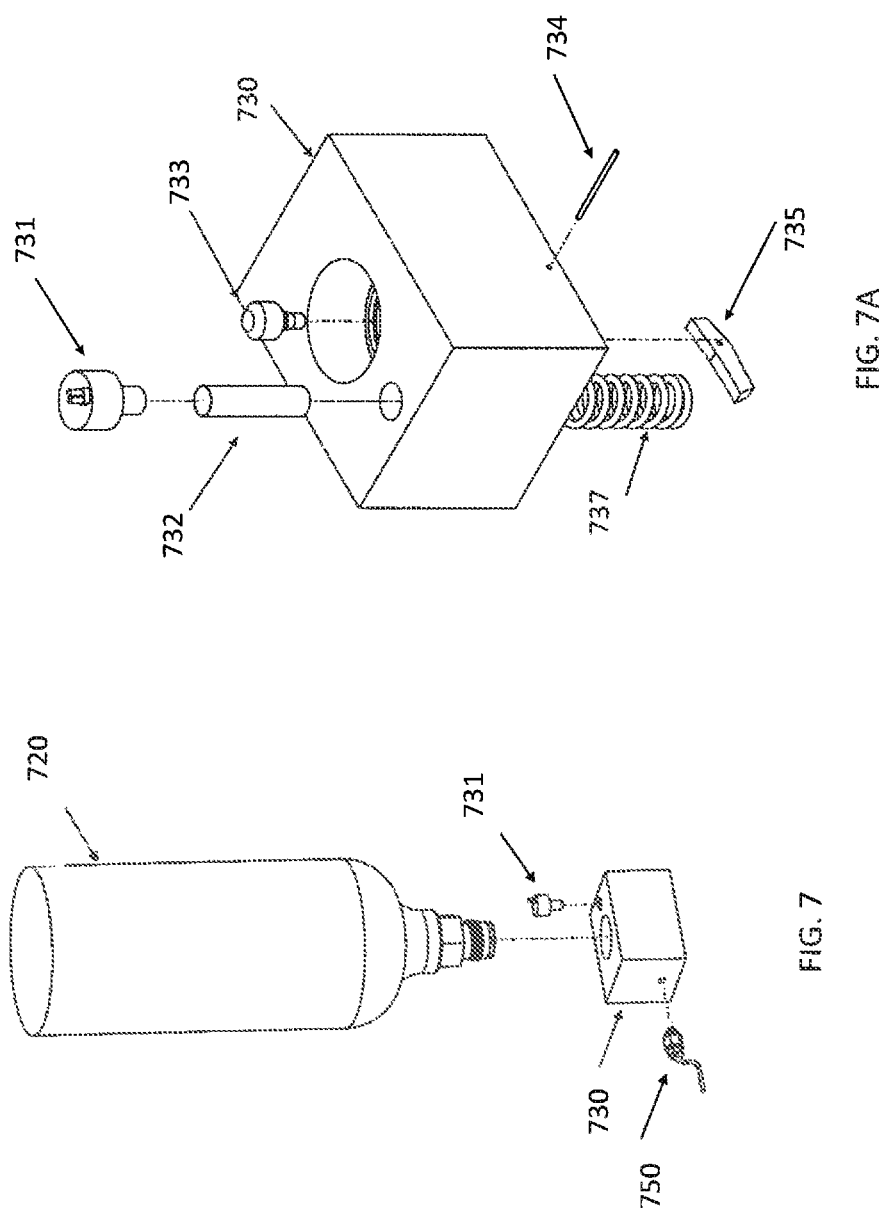

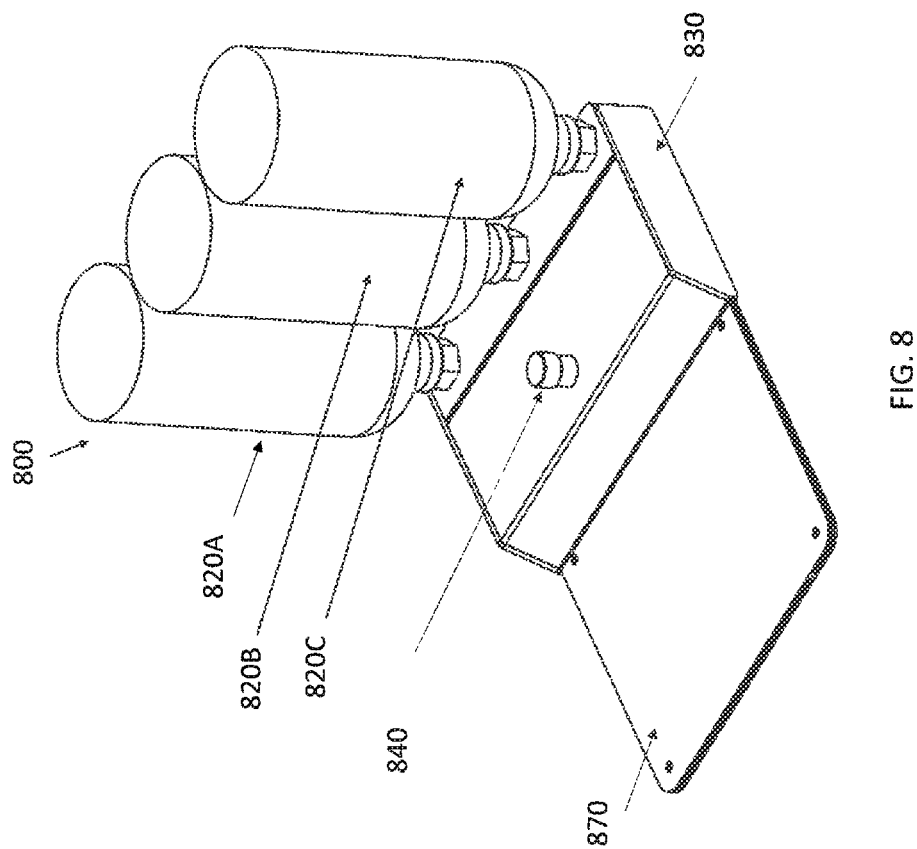

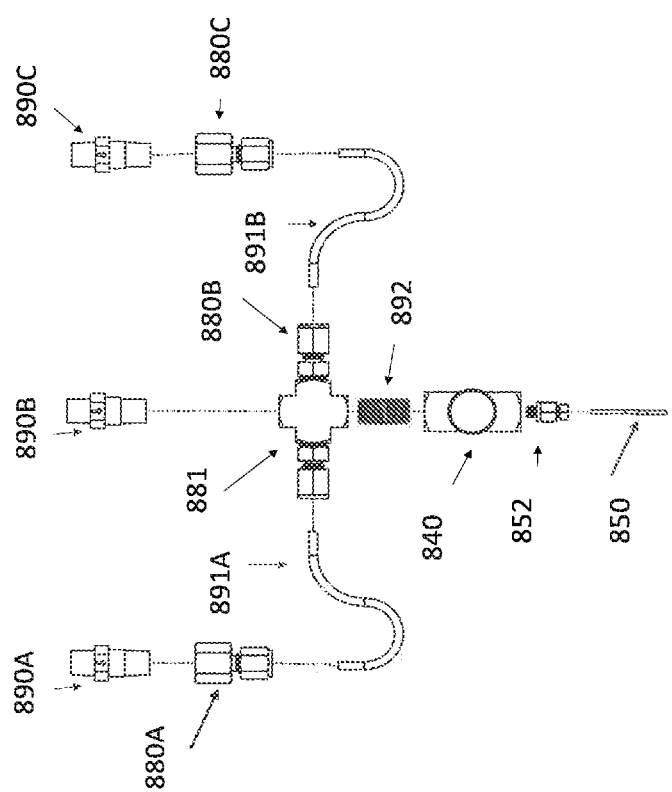

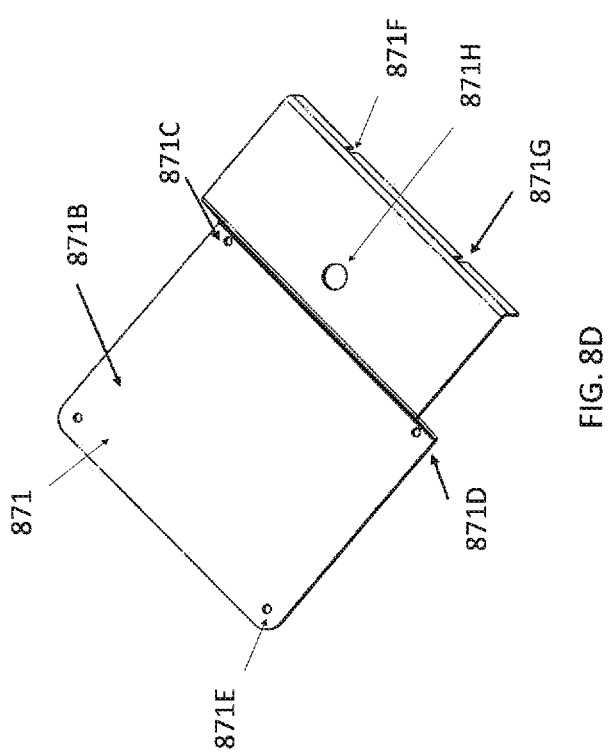

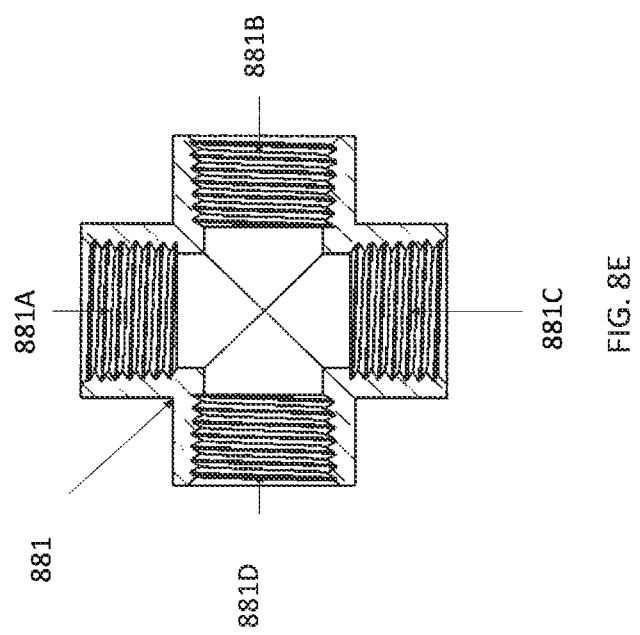

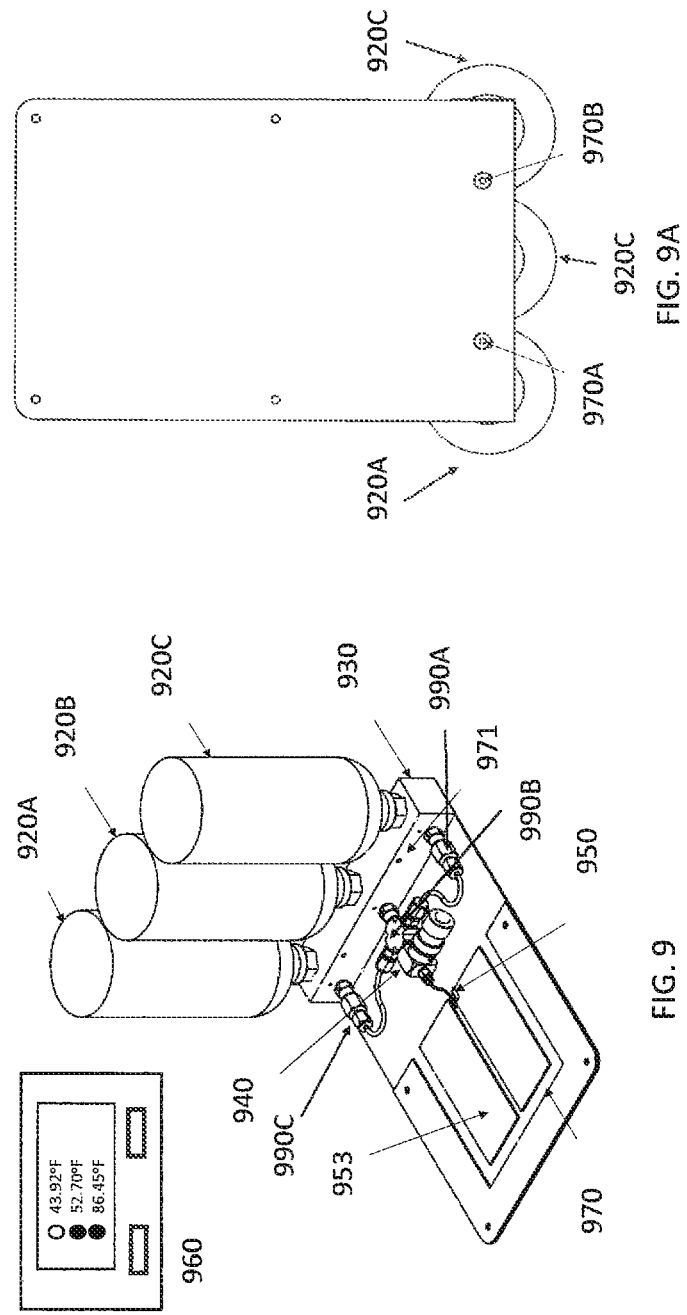

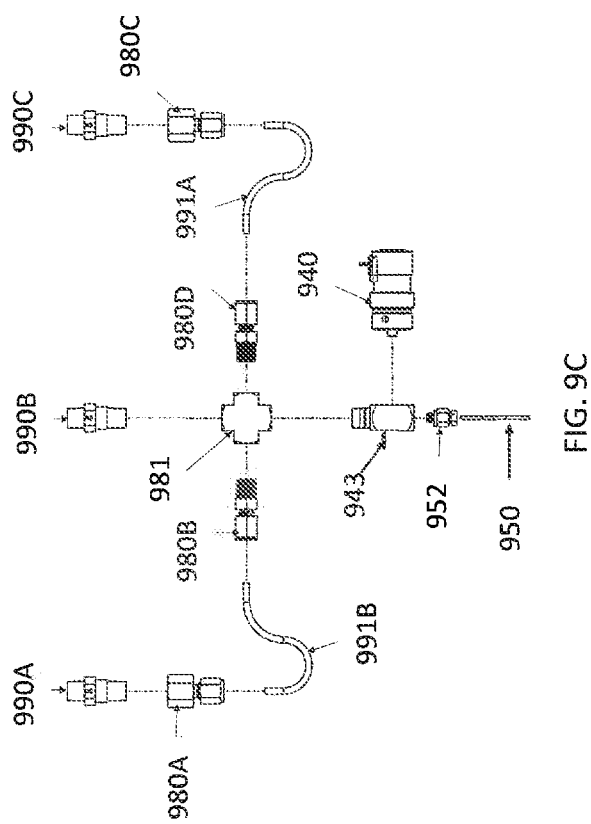

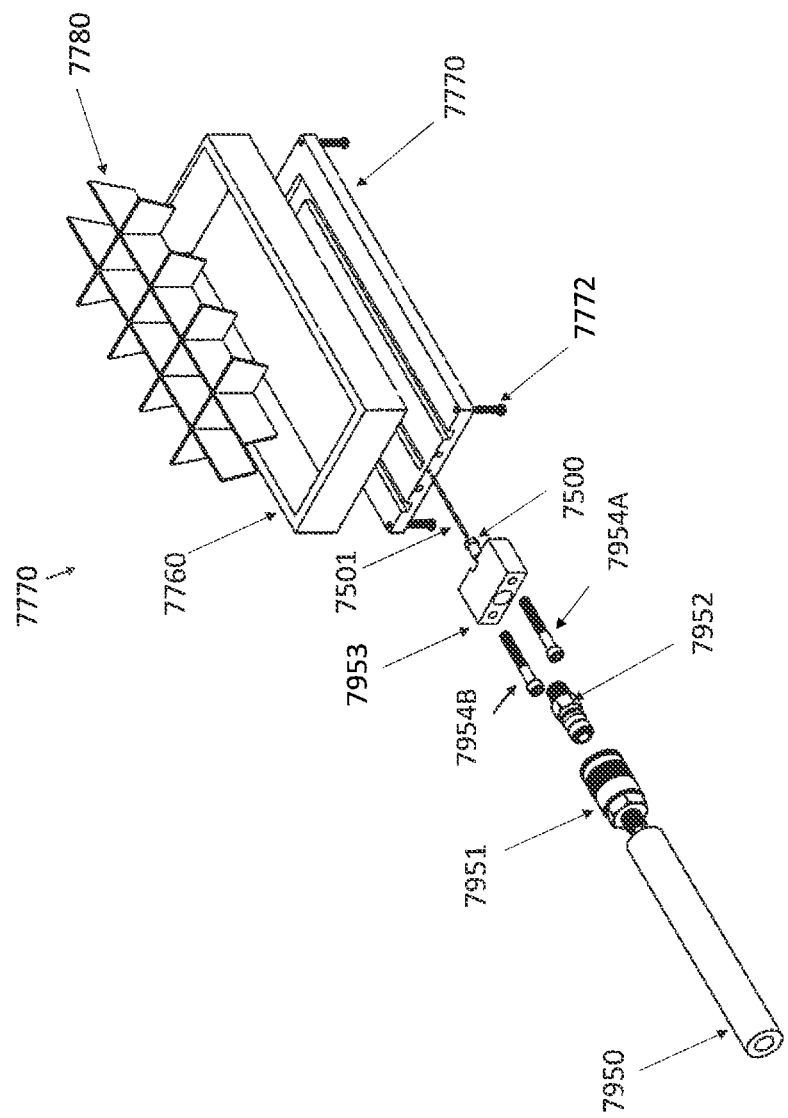

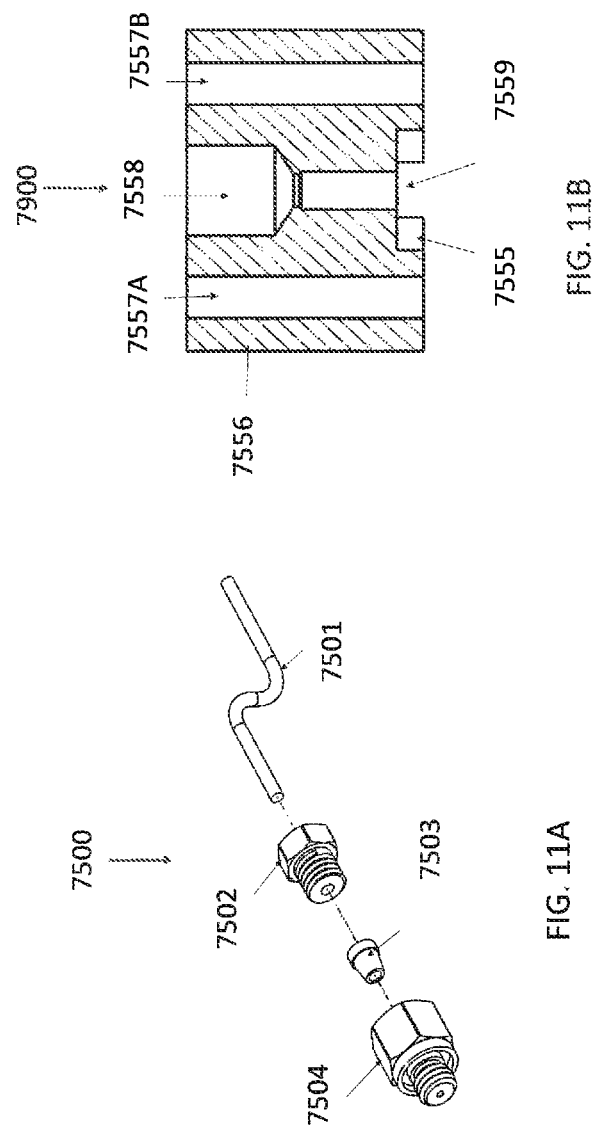

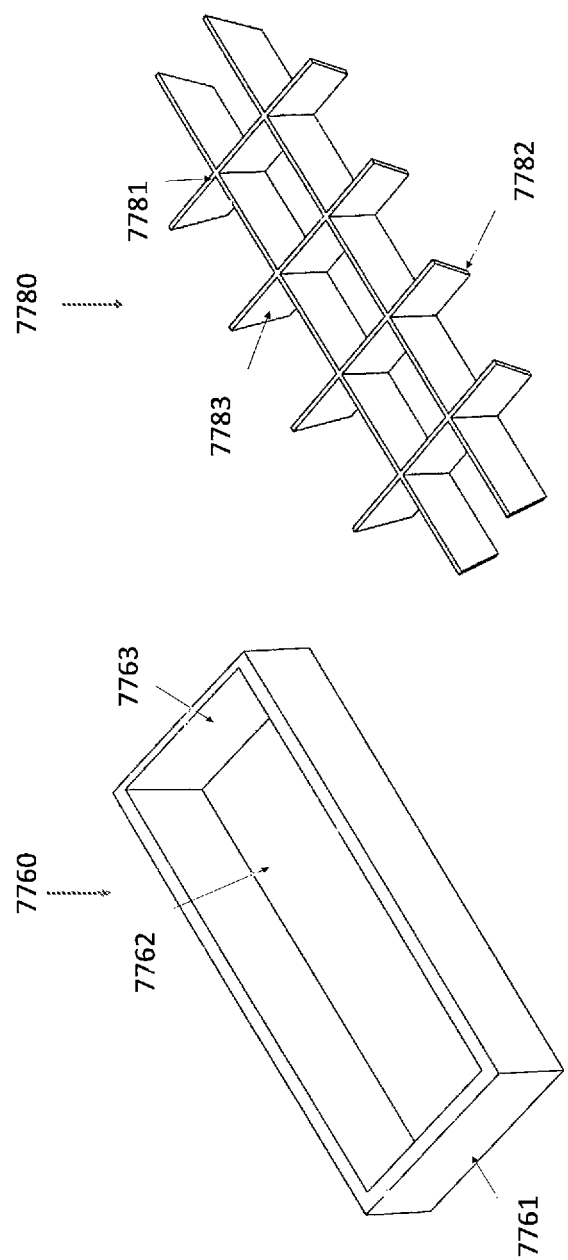

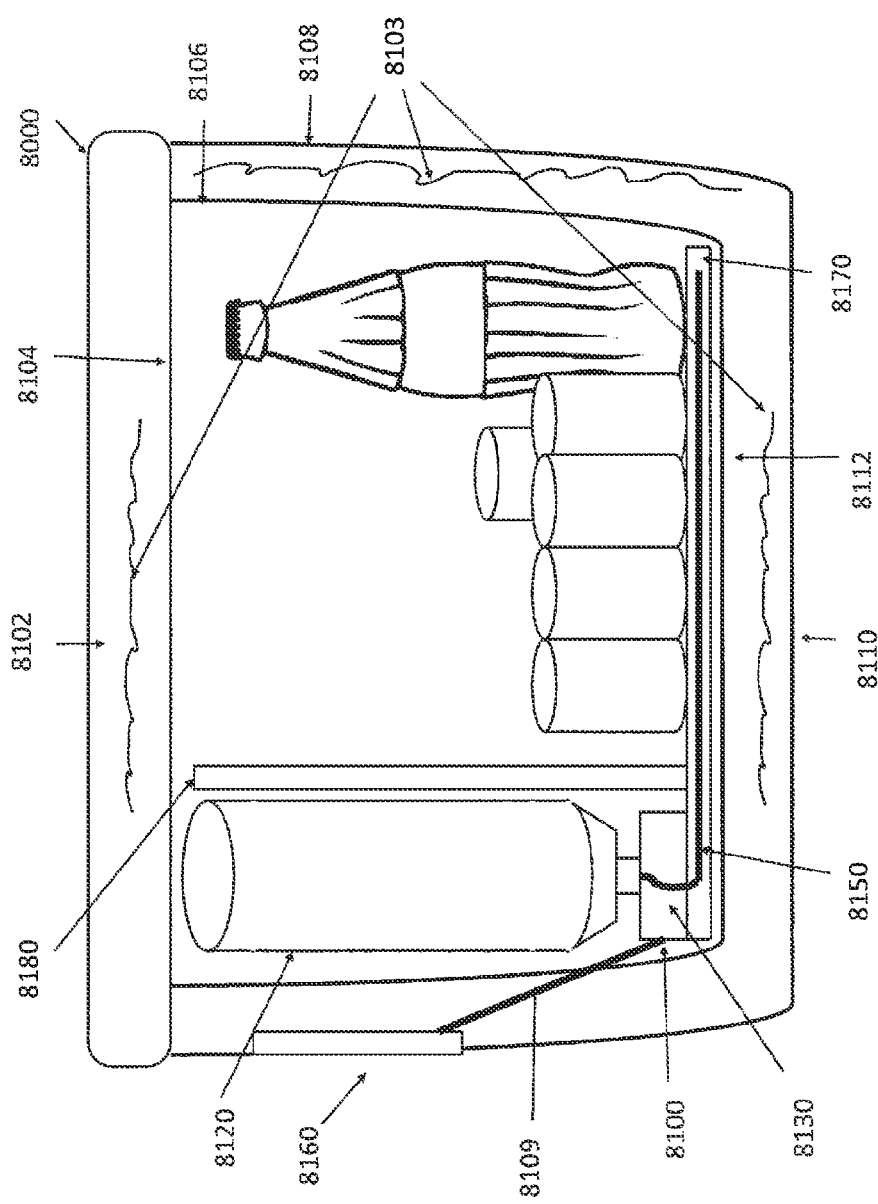

PORTABLE INSTANT COOLING SYSTEM WITH CONTROLLED TEMPERATURE OBTAINED THROUGH TIMED-RELEASE LIQUID OR GASEOUS $CO_2$ COOLANT FOR GENERAL REFRIGERATION USE IN MOBILE AND STATIONARY CONTAINERS

BACKGROUND OF THE INVENTION

1. Field of the Invention

This invention relates to the field of providing cooling temperatures to portable units such as insulated or non-insulated ice chests or coolers. These various items are intended for portable use where the product will be taken by individuals to locations which do not have electricity connections and which do not have conventional methods for refrigerating items such as food, beverages, medical supplies, blood, organs, temperature sensitive chemicals and pharmaceuticals, any prey resulting from fishing or hunting activities or any other perishable items in need of refrigeration, cooling or freezing for a desired period of time.

2. Description of the Prior Art

Methods for cooling items with no ices or available electricity have been known in the prior art but the apparatus and method to maintain controlled temperatures utilizing liquid and/or gaseous $CO_2$ as a refrigerant has not been found in any prior art. Therefore, there is a significant need for an improved apparatus and method to keep objects in a cool or even frozen condition depending upon the object and its requirement for its temperature control and the length of time it must be in the cooler or frozen condition.

The following prior art is the closest prior art which the present inventors have located and is the closest prior art to the best of the present inventors' knowledge related to the present inventors' invention.

1. U.S. Pat. No. 4,096,707 for "PORTABLE REFRIGERATION MACHINE" issued on Jun. 27, 1978 to Taylor.

The patent discloses a portable refrigeration machine that includes a vertically oriented pressure vessel containing carbon dioxide in gaseous, liquid and/or solid states. A heat exchanger is secured to the lower external portion of the vessel and an outer housing surrounds the vessel to leave an annulus between the exterior wall of the vessel and the interior wall of the housing. A gas pressure operated fan is disposed beneath the heat exchanger and connected for operation by gas pressure from the vessel to rotate. The fan draws in air through appropriate lower inlet openings which air passes through the heat exchanger and annulus out outlet opening to thereby cool and circulate the air in a compartment within which the portable refrigeration machine is placed. This device utilizes a gas pressure operated fan to maintain temperature and dispose heat to provide room for cool air.

This patent discloses fan-technology for use as a coolant and this is completely different from the present invention.

2. U.S. Pat. No. 4,195,491 for "DRY ICE REFRIGERATOR" issued on Apr. 1, 1980 to Roncaglione.

The patent discloses an apparatus for converting a conventional insulating picnic cooler or the like into a refrigerator and includes a small container, disposable within the cooler, for dry ice. A rectangular frame insertable within the interior of the cooler includes a pair of refrigeration coils, which are disposed in proximity to opposed side walls of the cooler. One end of each of the coils connects to the dry ice container. The other end of the coils connects to a manually adjustable valve having a pressed blowout section for relieving excess pressure. The valve is disposed in the exterior of the container. Gas flowing through the valve from the coil passes to the atmosphere through an indicator having a body of fluid in a transparent window so that bubbles produced upon passage of the gas are visible and allow manual adjustment of the valve to control the rate of gas flow and thus the rate of sublimation of the dry ice and the temperature within the cooler.

This device utilizes a valve controlled release in order to perform functions of maintaining temperature but has many deficiencies including the inability to monitor and maintain a specific temperature and no ability to be handled remotely. Therefore, the disclosure in this patent is different from the present invention.

3, U.S. Pat. No. 4,404,818 for "$CO_2$ SNOW COOLER WITH SNOW SPLITTING BOTTOM" issued on Sep. 20, 1989 to Franklin, Jr.

The patent discloses a vertically elongated hollow housing including opposite generally parallel side and end walls is provided and closed at its top by a top wall. $CO_2$ snow forming structure is disposed in an upper portion of the interior of the housing and a bottom wall structure closes the lower portion of the housing. The bottom wall structure includes an elongated horizontally disposed inverted V-shaped wedge of sharply tapered configuration extending between the end walls of the housing and the wedge is functional to split the lower portion of a quantity of snow disposed within the housing above the wedge and to force the lower portions of the quantity of snow into full surface-to-surface heat transfer relation with the inner surfaces of the lower portions of the side walls of the housing horizontally aligned with and opposing the wedge as the quantity of snow sublimes. Further, the sidewalls of the housing include vertically extending corrugations functioning to at least substantially double the exposed inner and outer surface area of the sidewalls. The corrugations themselves are trapezoidal in cross section whereby substantially full surface to surface contact between the lower portions of a quantity of $CO_2$ snow disposed within the housing and the inner surfaces of the corrugated side walls thereof is assured.

The disclosure in this patent utilized $CO_2$ to produce snow and it is not a device designed to keep items refrigerated under a controlled temperature.

4. U.S. Pat. No. 7,386,995 for "DEVICE FOR PRODUCING DRY ICE AND PRESSURE RELIEF THEREOF" issued on Jun. 17, 2008 to Gomes et al.

The patent discloses a device for producing a solidified block of carbon dioxide and includes first and second housing portions removably connectable together. The first and second housing portions form an interior molding chamber that is adapted to receive liquid carbon dioxide at a pressure where expansion of the liquid carbon dioxide occurs, resulting in a mixture of solidified and gaseous carbon dioxide. A pressure relief device includes a biasing member for biasing the first and second housing portions together. The biasing member permits relative movement between the first and second housing portions when internal pressure from the gaseous carbon dioxide exceeds a predetermined amount. With this arrangement, relative movement between first and second housing portions causes gaseous carbon dioxide to be released from the interior molding chamber to thereby reduce the internal pressure. This device utilizes liquid $CO_2$ for the only purpose of producing dry ice, which can be used to refrigerate items, and, it is not a device designed to keep items refrigerated under a controlled temperature.

5. U.S. Pat. No. 20120138848 for "COOLING AGENT FOR COLD PACKS AND FOOD AND BEVERAGE CONTAINERS" published on Jun. 7, 2012 to Leavitt et al.

The patent discloses a safe, stable, non-toxic and recyclable cooling compositions comprising solid particulate compounds that undergo an endothermic process when mixed with water such that the resulting mixture is useful for cooling surfaces, liquids and solids. The compositions always include one or more compounds from a group consisting of endothermic compounds that contain potassium; one or more compounds from a group of endothermic compounds that contain nitrogen; and at least one compound from a group consisting of ammonium phosphate, diammonium phosphate, ammonium polyphosphate, ammonium pyrophosphate and ammonium metaphosphate such that the compound or mixture of compounds in this group is at least 1% by weight of the final composition.

This method disclosed in this patent utilizes a mixture of several compounds to cool any given surface, solid or liquid. The present invention does not require this complicated process of using several compounds which itself could lead to many errors and problems.

6. U.S. Pat. No. 6,925,834 for "PORTABLE COOLER INCLUDING ICE SHEET HAVING REFRIGERANT CUBES" issued on Sep. 13, 2003 to Fuchs.

The patent discloses a portable cooler having one or more ice sheets including built-in refrigerant cubes. The cooler comprises an outer fabric shell and one or more sets of spaced apart refrigerant cubes encapsulated in plastic to form ice sheets that are attached to the interior walls of the cooler. The walls of the cooler may also include one or more layers of thermal insulation. The ice sheets provide a visually pleasing appearance to the inside of the cooler suggestive of cooling effects. The ice sheets may be retained along the walls of the cooler by seams sewn along the lanes passing between the refrigerant cubes, by being retained in pockets formed by sidewall liners or be being secured into chambers defined by the cooler's outer walls and a plastic insert fitted into the cooler.

This device utilizes ice sheets and the need to replace them as called for, with the temperature being maintained by manner of the insulated ice sheets.

The present invention does not use ice sheets and this disclosure is totally different from the present invention.

7. "CO2ler" is a product that has been identified on the Internet. However, the inventors' research and investigation into this product did not find any related patent. This product is a cooler that has been specially made to have a closed compartment for one $CO_2$ tank. The $CO_2$ system used in the "Co2ler" utilizes one tank only and it is not a device designed to keep items refrigerated under a controlled temperature.

None of the prior art has a method of system or apparatus to prevent or stop any freezing of an item or the freezing of an area.

None of the prior art has a method of system or apparatus to prevent the forming of the dry-ice while allowing the continuous flow of the $CO_2$ thus preventing dry-ice.

None of the prior art has the ability to control or regulate the temperature of items or areas to be limited to cooling or maintaining a predetermined temperature and preventing the decrease in temperature with the prior art methods or systems to prevent freezing of items or areas intended for the reduction or refrigeration of.

The use of $CO_2$ as a refrigerant in portable refrigeration similar to the present invention has previously been limited to the use of "dry ice". Dry ice has several drawbacks including: 1) production of dry ice from liquid $CO_2$ is relatively inefficient and a significant amount of $CO_2$ is wasted during the process, 2) the temperature of dry ice is too low to be used in direct contact with many items that require refrigeration temperature, 3) dry ice must be stored in an insulated container, as it sublimates at room temperature, reducing the dry ice's effective cooling capacity over time, 4) dry ice can be a safety hazard as its inherent temperature at atmospheric pressure can cause frostbite almost instantly.

There is a significant need for an improved apparatus and method to utilize $CO_2$ as a coolant in various applications.

SUMMARY OF THE INVENTION

The present invention is a standalone and self-contained cooling system using compressed liquid and/or gas $CO_2$ containers positioned in an insulated or non-insulated vessel and consisting of a specially designed unit where the containers are vertically positioned in an upright or in an upside-down position. The liquid and/or gas $CO_2$ coolant is then released into capillary tube(s) embedded into a heat transfer plate or heat exchanger thus leveraging the $CO_2$ coolant properties.

The temperature is controlled by a metering $CO_2$ releasing system encompassing an electronic control device which can be operated remotely and/or via a touch screen and which sends alerts when pre-defined thresholds are exceeded.

The invention's metering $CO_2$ releasing system may be triggered by an electronic or a thermostatic valve or may be triggered manually or by an electronic solenoid. The invention's cooling system also encompasses check valves, which avoid liquid and/or gas $CO_2$ from escaping when removing or replacing $CO_2$ containers individually.

The present invention consists of self-contained cooling system(s) using compressed liquid and/or gas $CO_2$ as coolant to refrigerate, cool or freeze items inside a portable insulated or non-insulated vessel. The present invention is capable of providing a controlled, steady and constant flow of liquid and/or gas $CO_2$ thus maintaining the items in need to be refrigerated, cooled or frozen at the desired temperature.

The present invention relates to the field of providing a source of cooling to desired temperatures going from cool to cold to freezing depending upon the product which is desired to be kept cold within the cooler or ice chest.

This invention relates to the field of providing constant and controlled cooling temperatures to various items using refillable $CO_2$ canisters as refrigerant without the necessity of electricity and without the necessity of having to have a built-in cooling unit within the container.

The following words: a) canister, b) cylinder, c) cartridge and d) tank are used interchangeably throughout this text to indicate the $CO_2$ refillable container.

The following words: a) release valve, b) control valve and c) dispense valve are used interchangeably throughout this text to indicate the releasing member allowing the liquid and/or gas the $CO_2$ to be distributed into the invention's cooling system in a controlled manner.

It has been discovered that the present invention provides the following advantages for using liquid $CO_2$, among the advantages including 1) liquid $CO_2$ is storable at standard ambient conditions, 2) cooling capacity does not degrade with length of storage, 3) there is no residual liquid $CO_2$ after cooling capacity is exhausted, 4) temperature is continuously variable from ambient to below −40° F. allowing, for example, to maintain ice cream frozen or to keep organs at a constant temperature for transplant transportation, 5) coolant is easily replaced without the need to remove material from the container volume, 6) $CO_2$ containers and refilling of $CO_2$ containers are already commonly available (e.g. beverage and paintball industry), 7) $CO_2$ is not wet or easily spillable as it is in a pressurized container.

The invention's cooling system is comprised of: a) one or more compressed liquid and/or gas $CO_2$ container(s); b) a heat exchanger plate connected to a manifold block; c) capillary tube(s) embedded in the heat exchanger plate to allow the coolant to be distributed homogenously along the said heat exchanger plate; d) a manifold block where the $CO_2$ container(s) is/are screwed into or attached on; e) check valves which are used to avoid $CO_2$ from escaping when removing or replacing containers individually; f) a metering $CO_2$ control releasing system and a control algorithm for controlling, monitoring and regulating, automatically or manually, the release of the liquid and/or gas $CO_2$ inside the invention's cooling system; g) a control valve, as part of the metering $CO_2$ control releasing system, which releases the liquid and/or gas $CO_2$ in the capillary tube(s) and which has been specifically customized to prevent freezing, clogging and blocking of the capillary tube(s) by calibrating the optimal flow of liquid and/or gas $CO_2$; the control valve may be electronically, thermostatically, manually or electromechanically operated; h) an electronic unit to operate the invention's metering $CO_2$ control releasing system which may be operated using a touch screen or, remotely, using a smartphone application or any other electronic devices; the invention's cooling system has different variations according to the type of release valve and to the number of $CO_2$ container(s).

The liquid and/or gas $CO_2$ containers are positioned in the invention vertically in an upright or upside-down position.

When the $CO_2$ container(s) is/are in an upright position, the invention's control valve has a siphon tube of a suitable length to be able to reach the bottom of the $CO_2$ container. The siphon tube allows the liquid $CO_2$ to flow from the bottom to the top of $CO_2$ container and then to exit through the invention's control or release valve.

When the $CO_2$ container(s) is/are in an upside-down position, because of the gravity force, the liquid or gaseous $CO_2$ flows from the $CO_2$ container and exits through the invention's control or release valve.

It is also an object of the present invention to provide a special designed manifold block where the $CO_2$ container(s) are placed on, and which allows the passage of the refrigerant from the $CO_2$ container(s) into the invention's cooling system.

It is an object of the present invention to provide a cooling system containing a heat transfer plate (also referred to as heat exchanger) and liquid and/or gas $CO_2$ distribution through capillary tubes embedded in the said heat exchanger to maximize energy transfer from the liquid and/or gas $CO_2$ to the contents of a vessel which may or may not be insulated, thereby keeping the vessels' contents at a desired temperature.

It is additionally an object of the present invention to provide capillary tube(s) to convey the liquid and/or gas $CO_2$ along the heat transfer plate of the invention's cooling systems. The capillary tube(s) allows the flow of the liquid and/or gas $CO_2$ being released for the purpose of maintaining or reducing the temperature of the containers being cooled by the cooling systems.

It is a further object of the present invention to provide a metering $CO_2$ control releasing system for the $CO_2$ release which enables the controlled release of the liquid and/or gas $CO_2$ inside the invention's cooling systems.

It is a further object of the present invention to provide release valve (also referred to as control valves), as part of the metering $CO_2$ control releasing system, which can be controlled or actuated manually, electromechanically, electronically or thermostatically, to release the liquid and/or $CO_2$ from the $CO_2$ containers into the invention's cooling systems. The invention's control valves are specifically designed to prevent the freezing and clogging and blocking of the capillary(s) tubing by calibrating the control valves to flow the optimal amount of liquid and/or gas $CO_2$. Without the inventions control valves in the invention's cooling systems, the invention's capillary tubes could be clogged or blocked or frozen not allowing the liquid and/or gas $CO_2$ to be properly released. The invention's designed cooling systems are capable of providing a steady and constant flow of liquid and/or gas $CO_2$ to insulated or non-insulated portable units (i.e.: ice chests, coolers, lunch boxes), stationary units (i.e.: refrigerators, freezers), compartments of vehicles (i.e.: trunk or cabinet located in a car or autonomous vehicles), aircrafts, small unmanned aerial vehicles (drone), motorcycles, scooters or bicycles.

It is also an object of the present invention to provide a cooling system with multi-$CO_2$ containers with configuration that comprises check valves. The check valves are used between the container manifold block and the connections joining the $CO_2$ containers. This eliminates liquid and/or gas $CO_2$ from escaping when removing or replacing tanks individually. The compressed $CO_2$ containers are positioned in the invention's specifically designed cooling systems in a vertical upright or upside-down position in order to maintain the $CO_2$ liquid and gas balance within the $CO_2$ container when the liquid/and or gas is expelled from said container.

It has been discovered according to the present invention that when the $CO_2$ container(s) is(are) in an upright position, the invention's control valve has a siphon tube of a suitable length able to reach the bottom of the $CO_2$ container. The siphon tube allows the liquid $CO_2$ to flow from the bottom to the top of $CO_2$ container and then to exit through the invention's control valve.

It has further been discovered according to the present invention that when the $CO_2$ container(s) is(are) in an upside-down position, the liquid goes down because of gravity force and the liquid $CO_2$ flows from the bottom to the top of $CO_2$ container and then exits through the inventions' control valve.

It is an additional object of the present invention to provide a metering $CO_2$ control releasing system which is monitored, controlled and operated electronically using a touch screen or, remotely, using a smartphone application or any other electronic devices. The invention's metering $CO_2$ control releasing system has different configurations according to the type of release valve and to the number of $CO_2$ container(s).

It is also an important object of the present invention to provide cooling systems that also includes an electronic control device powered by battery, solar panel or +12V socket in the car, which allows to monitor and control temperatures, control algorithms, and a metering $CO_2$ control releasing system. These components are attached to, or enclosed in, or can be placed in any kind and any size insulated or non-insulated vessels to minimize heat transfer with the environment.

It is also an object of the present invention to provide a system which contains an electronic control strategy using encrypted data to avoid spoofing, intrusion, interference, meaconing, jamming or data falsification. To encrypt the transmitted data a message authentication code (MAC) method will be used. Because an active control (electronic) is the most accurate, flexible, and easy to operate, it is envisioned that this is the preferred embodiment. Data is transmitted from the active controllers of the inventions' cooling systems via WiFi, Bluetooth and Radio Frequencies to a smartphone or tablet or a server or any kind of other device will be encrypted to avoid spoofing, intrusion, interference, meaconing, jamming or falsifying data.

It is additionally an object of the present invention to provide a cooling system which can be transported, stored and moved to locations which do not have electricity connections, where electrical service has been disrupted (e.g. utility power outage) or which do not have conventional methods for refrigerating, cooling or freezing.

The invention of the cooling systems was envisioned by the inventors working together on delivering the optimum cooling system which results in cooling temperatures utilizing liquid and/or gas $CO_2$ to insulated and not-insulated vessels, containers, compartments, enclosed areas, cooling systems claimed in this invention utilizing any type and size of $CO_2$ containers positioned on, in or near an area where there is a need or desire to reduce or to maintain a specified or required temperature.

Many additional features, apparatus and methods of the present invention are described in the following paragraphs.

The design is specific for the use of coolers and can be also designed for any type of system that is in need of refrigeration. The invention is not required to have any specially made cooler as it is a standalone and can be designed specific.

The present invention includes a specially designed insulated cooler which embeds the invention's cooling system and the electronic control device to monitor and control the temperature.

The present invention includes an additional accessory that can be placed into the cooler to produce ice on a specially designed ice making system in a period of time from 1 to 10 minutes. The mechanism to convey the liquid and/or gas $CO_2$ into the specially designed ice making system may be directly connected to the capillary assembly. The specially designed ice making accessory includes: a) a connection assembly to the principal unit of this invention, b) an ice tray block which is attached to a bottom cold disbursement plate with fasteners, c) a containment tray which holds the water or other liquids where the cold is dispersed into; d) a divider which will be full of water or other liquids. The plate assembly is fastened together by ice tray bottom plate fasteners.

The present invention includes a cooling system for individual beverage containers such as cans/bottles or individual containers, which needs to be cooled or to be maintained at a cooled temperature or frozen. This invention's cooling system has a circular designed casing which, except for the top of the cooling unit, is enclosed allowing for a beverage container to be placed into it. The cooling unit has the invention's control system utilizing the manual, electromechanical, electronic or thermostatic valve depending and according to the type of beverage(s) intended or desired to be cooled.

The present invention also includes a portable cooling system equipped with wheels to be easily transported and which can be easily connected to a refrigerator through a suitable connector designed in collaboration to the refrigerators' makers or a capillary passing through the refrigerator's door gasket in order to deliver $CO_2$ as a coolant to the refrigerator when a power supply outage occurs. The $CO_2$ canister is in the upright position with a siphon tube of a suitable length able to reach the bottom of the $CO_2$ container. The siphon tube allows the liquid $CO_2$ to flow from the bottom to the top of $CO_2$ container and then to exit through the invention's control or release valve. This invention's cooling system is envisioned to be specifically designed to be connected and attached to the refrigerator system to minimize or eliminate the amount of heat transfer from the refrigerator to the external environment.

The present invention additionally includes a system designed to transport goods, which need controlled refrigeration such as medical, pharmaceutical, foods and any other small cooled or frozen items using a Small Unmanned Aerial Vehicle (SUAV, also called "Drone"). This invention's cooling system is envisioned to be specifically designed to be connected and attached to a specific drone according to its mechanical elements.

This disclosure focuses on the system as a whole as well as the electronic control strategy. Because the electronic control system utilizing smartphone communication for monitoring and control and other sensing options is the most accurate, flexible and easy to operate, it is envisioned as the preferred embodiment. Other options such as incorporating a manual, electromechanical or thermostatic $CO_2$ releasing mechanism are envisioned.

The present invention, either standalone or embedded in a specially designed insulated cooler, can be applied to refrigerate, cool or freeze individual bottles, cans or containers, insulated or non-insulated portable units (i.e.: ice chests, coolers, lunch boxes), stationary units (i.e.: refrigerators, freezers), compartments of vehicles (i.e.: trunk or other cabinets of trucks, cars, motorcycles, scooters, bicycles or autonomous vehicles), compartments of aircrafts or small containers transported by drones.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of one embodiment of the present invention cooling apparatus utilizing a single $CO_2$ cylinder threaded into a single manifold block which in turn is connected to a valve which in turn is connected to a capillary, the valve operated manually (first variation);

FIG. 1A is a cross-sectional view taken along line A-A of FIG. 1 to show the cross-sectional components illustrated in FIG. 1;

FIG. 2 is an exploded view of the present invention in the first variation with a valve operated manually;

FIG. 2A is a cross-sectional view of the manifold block;

FIG. 5 is a representation of the second variation of this invention where the release valve is operated electronically;

FIG. 5A is a cross-sectional lateral view of the electronic release valve;

FIG. 5D illustrates the block diagram of the electronic control device;

FIG. 6 is a representation of the third variation of the present invention with a release valve operated thermostatically;

FIG. 6A is a cross-sectional view of the thermostatic valve;

FIG. 7 is a representation of the fourth variation of the present invention with a release valve activated by an electronic solenoid;

FIG. 7A is an exploded view of the manifold block including the electronic solenoid;

FIG. 8 is a representation of the fifth variation of the invention's cooling system in the variation with three $CO_2$ canisters and with a release valve which is manually operated;

FIG. 8C is an exploded view of the fluid communication assembly of the fourth variation of the invention's cooling system;

FIG. 8D is a representation of the top plate which covers the heat exchanger;

FIG. 8E is a cross sectional view of the ⅛" cross fitting member;

FIG. 9 is a representation of the sixth variation of the invention's cooling system in the configuration with three $CO_2$ canisters and with a release valve which is electronically operated;

FIG. 9A is a view of the bottom of the invention's cooling system in the fifth variation;

FIG. 9C is an exploded view of the fluid communication assembly of the fifth variation of the invention's cooling system;

FIG. 11 is an exploded representation of the eighth variation of the invention's cooling system which includes an accessory to make ice in a range from 1 to maximum 10 minutes;

FIG. 11A is an exploded view of the fluid communication assembly of ice making accessory mechanism;

FIG. 11B is a cross sectional view of the block used for the ice tray design;

FIG. 11D is a prospective view of the water containment tray used in the ice making accessory mechanism;

FIG. 11E is a prospective view of the water divider used in the ice making accessory mechanism;

FIG. 17 is a representation of the present invention's cooling system embedded in a cooler which includes the electronic unit control.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Defined broadly, the present invention is an apparatus and method for maintaining items such as beverages, food and other items in need of refrigeration in a cool, cold or freezing temperature to preserve the items for an extended period of time, as required by the item.

Figure 1B:
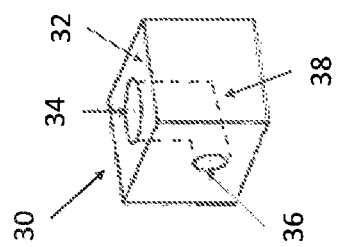
FIG. 1B is an exploded view of the components in FIG. 1 illustrating the single $CO_2$, manifold and other components in their separate condition.

Referring to FIGS. 1, 1A and 1B, there is illustrated an embodiment of the present invention cooling system utilizing a single $CO_2$ cartridge. There is illustrated as a system 10 a single $CO_2$ cartridge 20. The $CO_2$ cartridge 20 has an exterior circumferential wall 22 and a top wall 24 surrounding a first interior chamber 26 which contains $CO_2$ 28 under pressure. The bottom of the cartridge 20 is connected through a curved circumferential wall 27 to a tube member 23 which has threads 29 thereon. Also illustrated is the block manifold 30 having a top 32 with internal threads 34 leading to a second interior chamber 36. The second interior chamber 36 is surrounded by an L-shaped tube 38 (shown in dashed lines) that extends from the tube 29 of the $CO_2$ cartridge 20 and ending in a manual valve 40. The valve in turn is in fluid communication with a capillary unit 50 having a capillary tube 52 in fluid communication with tube 38.

Referring to FIG. 2, there is also illustrated an exploded view of the system 100 with the $CO_2$ cartridge 120, the manifold block 130 which is connected to the manual valve 140 through the member 149 which has a cavity to allow the passage of $CO_2$. The capillary tube 150 is connected to the manual valve 140 through a threaded member 159 having an internal cavity to allow the passage of the $CO_2$.

FIG. 2A is a cross-sectional view of the manifold block 130 having a manifold internal chamber 132 obtained from the manifold block 135, the manifold internal chamber 132 having an internal wall 131, being fixed to the block through the first circumferential wall 136 and being connected to the cavity 137 through the second interior chamber 133, thus forming an L-shaped tube which allows the passage of the $CO_2$ from the refillable tank or cartridge 120 to the valve 140 of FIG. 2.

Figure 3:
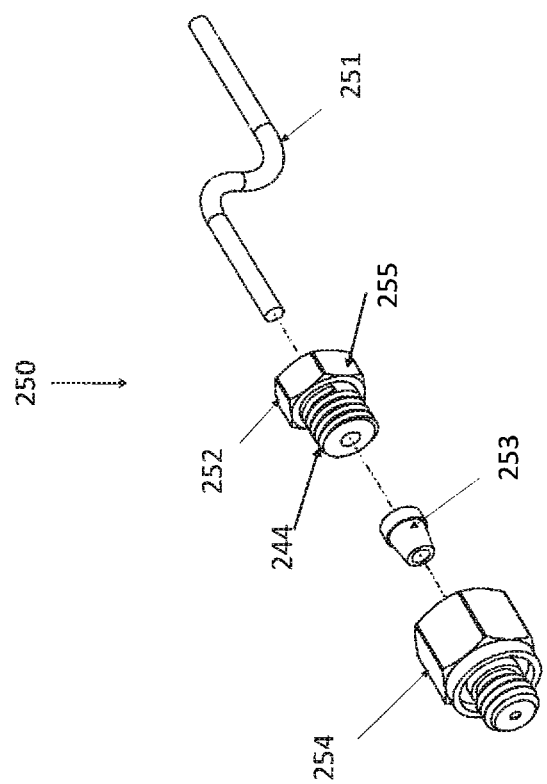
FIG. 3 is an exploded view of the capillary assembly.

Referring to FIG. 3, there is illustrated a cross-sectional view of the capillary unit 250 with the tube element 251 connected to a bolt 255 having a hollow opening 252 to allow the passage of $CO_2$ 28 and having an external male threads 244 mating where the female thread mating 254 is screwed into through the connector junction 253.

Figures 4, 4A:
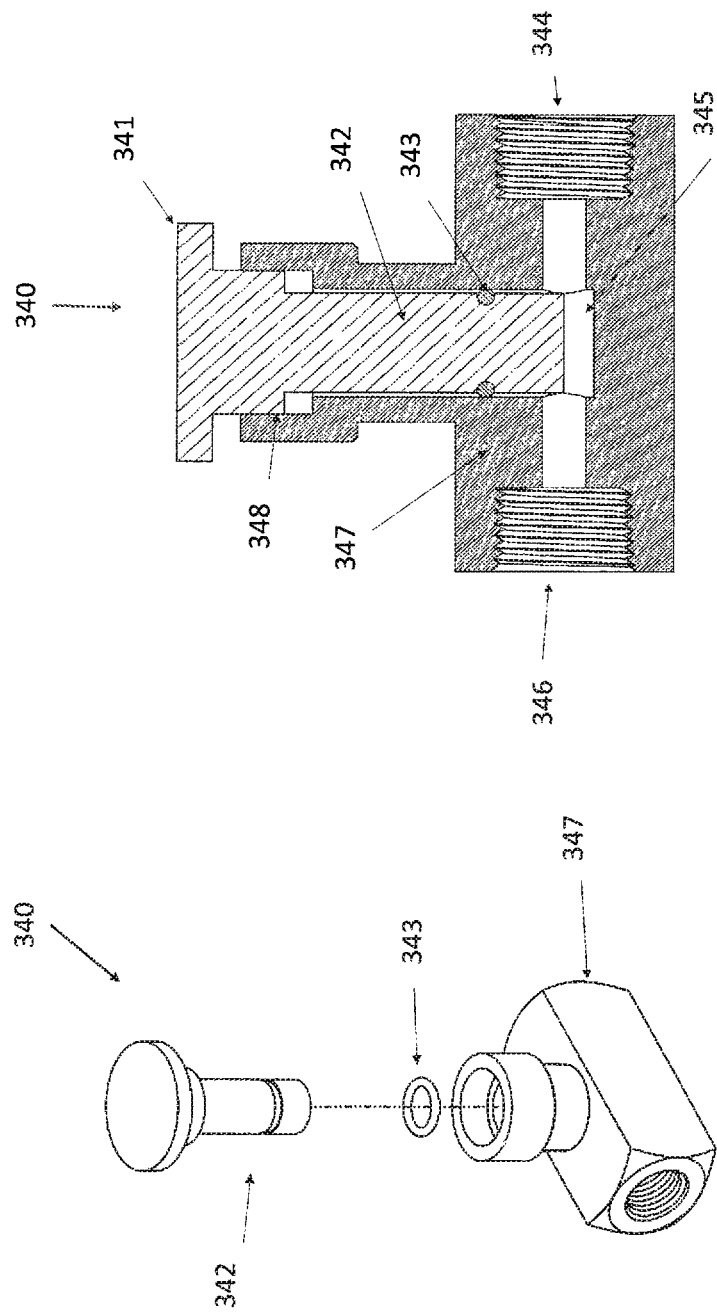
FIG. 4 is an exploded view of the manual valve.
FIG. 4A is a cross-sectional view of the manual valve.

FIGS. 4 and 4A illustrate an exploded view and a cross-sectional view of the manual valve 340 respectively, which has a stem 342 going into the main body 347, having a top side 341, an O-ring 343, and two threaded cavities 344 (inlet), and 346 (outlet) respectively which have the purpose to connect the valve to the manifold block 130 of FIG. 2 from one side, and to the capillary unit 250 of FIG. 3 from the other side.

Figure 5B:
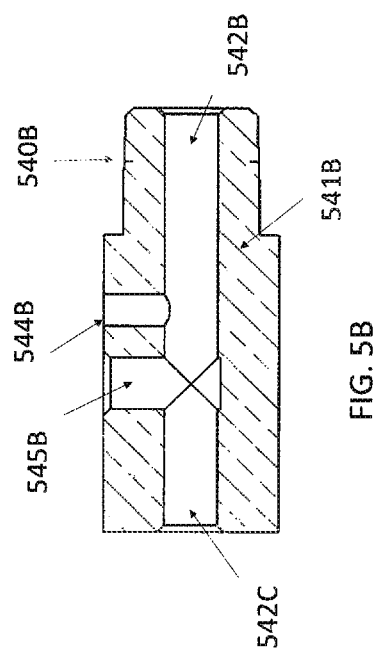
FIG. 5B is another cross-sectional top view of the electronic release valve.
Figure 5C:
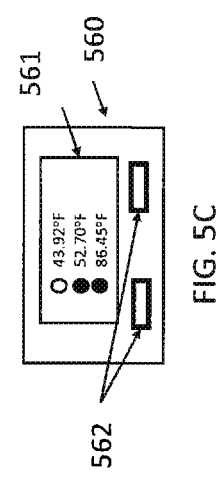
FIG. 5C illustrates an electronic display where the temperatures outside, inside and at the upper surface of the heat exchanger are visualized and controlled.

Referring to FIGS. 5, 5A, 5B and 5C, there is illustrated a second variation of the present invention cooling system utilizing a single $CO_2$ cartridge as illustrated in FIGS. 1 and 1A operated by an electronic valve 540 and an electronic control device 560. The electronic valve 540 is located between the manifold block 530 having the same technical characteristics of the one described in FIGS. 1B and 2A and the capillary unit 550 as illustrated in FIG. 3. The member 543 serves as a connector junction between the manifold block 530 and the capillary unit 550. The electronic control device 560 evaluates the temperature of the cooler and its surroundings and electronically opens the electronic valve 540 to release liquid $CO_2$ 28 through a capillary 550 until a set threshold temperature inside the cooler is achieved. The electronic control device has been specifically designed with a display 561 showing three controlled temperatures (outside the cooler, inside the cooler and at the upper surface of the heat exchanger) and two configurations buttons 562. A schematic diagram of the electronic control device is set forth in FIG. 5D. FIGS. 5A and 5B represent two different cross-sectional views of the electronic valve respectively 540A and 540B with the valve body 541A and 541B which has a valve stem 544A and 544B, a valve plunger 542A, 542B, 542C, two disks, a conduct opening 545A and 545B where the $CO_2$ pass by.

FIG. 5D represent a schematic view of the electronic control device. The control device has 9 subsystems in its electronics. Each system is specifically tuned to work in conjunction with every other system in the network, providing maximum interoperability. The primary system is the MCU 568 which interprets all input and determines output from those factors.

Then there are the output systems. These consist of the Display 561, the Valve (through the Step Up Converter) 540, the Bluetooth Radio 564, and the Indicator Lights 566. The Display 561 is responsible for outputting all information to the user, except what is provided by the indicator lights 566; however, there may be redundancy between the information conveyed. The Valve controls the flow of $CO_2$ in the system and thus, regulates temperature. The Bluetooth Radio 564 provides a means of communication between the companion app and also functions as an input. The Indicator Lights 566 are responsible for making available the most important information to the user.

Related to the output systems are the input systems. These include the Touch Screen 562, the Digital Temperature Sensors 565, and the Bluetooth Radio 564. The Touch Screen 562 provides all input to the device save for what is provided by the companion app, there may be overlap between the two. The Digital Temperature Sensors 565 are responsible for sensing the temperature, they are digital to provide a greater degree of accuracy and precision. The Bluetooth Radio 564 functions as a means of communication between the companion app and the Frostime unit. It also functions as an output.

In addition to those systems mentioned above, the electronic control device also has two systems required for full operation. These are the Storage system 567 and the Step Up Converter 563. The Storage system 567 stores all data collected by the electronic control device so that it may be retrieved later, it may be thought of as an input and output for the MCU 568 but is not intended to be directly accessed by the user. The Step Up Converter 563 is required to couple the MCU 568 and the Valve systems 540 together due to their electrical differences.

Figure 5E:
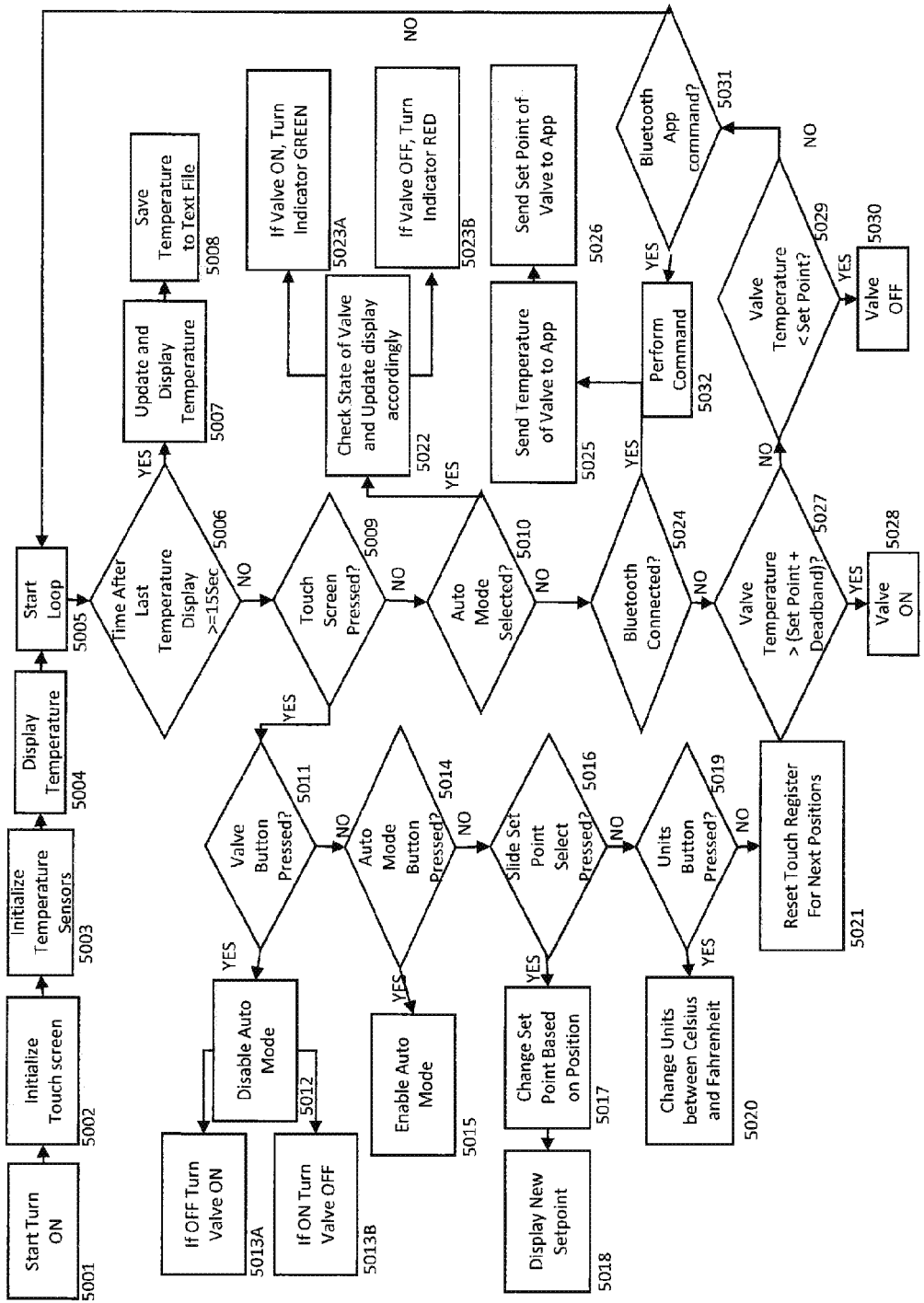
FIG. 5E illustrates the flowchart of the software program running on the electronic control device hardware.

FIG. 5E is a representation of the electronic control device software flowchart. The moment the power switch is toggled into the "On" position 5001 by the user, the electronic control of the invention's cooling system begins its startup routine labeled 5000. The routine proceeds as follows. First the Touch Screen/Display module 5002 is powered and initialized. Then the temperature sensors 5003 are initialized.

After all sensors and hardware has been initialized, the temperature is displayed 5004 to the display and the control unit software enters its primary operating routine 5005. This routine conditionally executes subroutines based on measurements performed and preset timers. It is responsible for changing the valve from open to close to regulate temperature based on data from the temperature sensors, as well as detecting and handling input from the touchscreen and displaying data to it.

The first condition checked 5006 is whether or not the displayed temperature has been updated in the last 15 seconds. If it has not been, the temperature on the display is updated 5007 and also saved to a log file 5008. Next, regardless of the previous condition, the control electronic software checks if the touch screen has been pressed 5009. If this is true, it checks specifically if the valve button was pressed 5011. If so, Auto mode is disabled 5012 and the position of the valve is toggled from its current state to the opposite one (open to close 5013A, close to open 5013B).

If the valve button was not pressed 5014, but there was still a touchscreen touch detected 5009, the Auto Mode is enabled 5015. In this mode the device will open and close the valve to maintain the set temperature, further description of this mode can be gained in the additional description of the main routine below.

If none of the above touch screen events have occurred, but there was still a touch, the control software then checks if the touch was in the sliding temperature adjustment interface 5016. If it was, the graphic slider is adjusted to represent the set temperature 5017 and the new set point is displayed 5018. It does so by changing its rightmost endpoint to the point of touch.

If neither the valve, the auto mode, nor the slider were touched, the control software of the invention's cooling system performs one last check 5019 to see if its units' button has been touched. If so the units are toggled from Fahrenheit to Celsius or Celsius to Fahrenheit depending on the initial units at the time of the press 5020. Finally, in the event of a touch, after all buttons are checked, the internal touch registers containing information about where the touch took place are reset in order to be ready for the next touch event 5021.

After checking the touch screen for input 5009, the control software of the invention's cooling system checks if auto mode is enabled 5010, if so it echoes the valve's current state 5022 to the display via a green light to represent an On valve 5023A and a red light to indicate and Off valve 5023B.

Then Bluetooth Connectivity is checked 5024. If it is connected, then the temperature of the valve is sent to the app 5025 as well as the temperature the device is set to maintain 5026.

Next, the device checks the temperature. If this temperature is above the set point selected by the user plus a small preset deadband value 5027 to reduce unnecessary cycling of the valve, the valve is opened 5028. Next, the device checks if the temperature is below the set point minus a small preset deadband value 5029. If this is the case, the device's valve is set to the off, closed position 5030.

Finally, the device performs another check 5031 for any received Bluetooth commands. If one command was received, it is executed 5032.

This concludes the primary operating routine; it is repeated 5033 until the power switch is switched to the "Off" position.

Figure 6B:
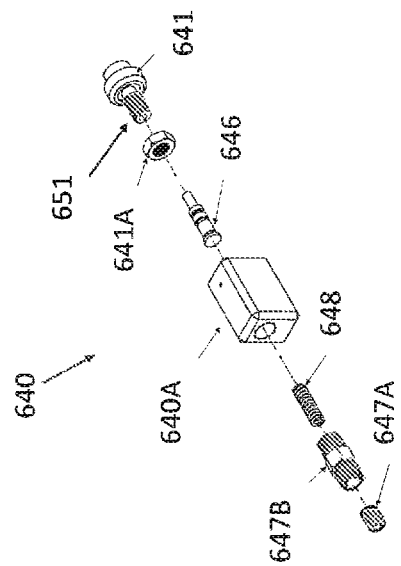
FIG. 6B is an exploded view of the thermostatic valve.

Referring to FIGS. 6, 6A and 6B, there is illustrated a third variation of the present invention utilizing a thermostatic poppet valve 640. The thermostatic poppet valve 640 is specially designed and allows the liquid or gas $CO_2$ 28 to flow from the $CO_2$ cartridge 620 screwed onto the manifold block 630 to the capillary tube 650 connected to the thermostatic poppet valve 640 through the connector 652.

FIG. 6A displays a cross-sectional view of the thermostatic poppet valve 640 in the closed position. The body of the valve 640A has a head 641 which encapsulates a wax or polymer. As the temperature increases, the polymer or wax expands and pushes down plunger 642, allowing flow from the entrance from the pipe nipple 645 to the exit 649. The spring 648 applies force to the plunger to prevent it from not sealing when the unit is not under pressure, this is called preloading. A pressure relief hole 643 prevents the forming of a too great stress caused by too much pressure in the unit in cases of unusually extreme pressures. Set screw 646 is used in conjunction with a set screw hole 651 to retain the spring and allow the passage of fluid. Parts 644A, 644B and 644C are sealing O-rings. Part 641A is a jam nut to allow the thermostatic poppet valve 640 to be placed at the correct depth. Part 640A is the main body of the thermostatic poppet valve 640 and this can also be considered a manifold.

FIG. 6B displays the exploded view of the thermostatic poppet valve 640 having the main body 640A which has a thermostatic actuator 641 and is connected to the manifold block through a set of screws 647A and 647B. On the opposite side of the main body 646 is a set screw with a hole to retain the spring 648 and allow the passage of fluid.

Figure 7C:
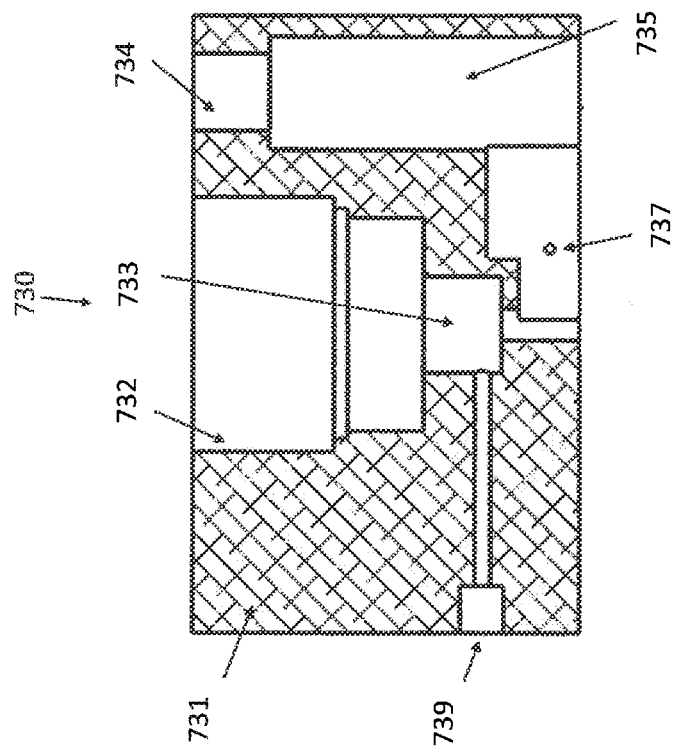
FIG. 7C is a cross-sectional view of the manifold block including the electronic solenoid.
Figure 7B:
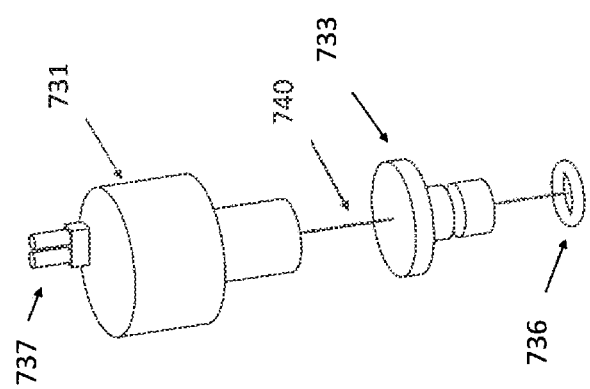
FIG. 7B is an exploded view of the electronic solenoid.

Referring to FIGS. 7, 7A, 7B and 7C there is illustrated a fourth variation of the present invention which uses a solenoid valve included into the manifold block which replaces the release valve's operation of the previous six variations and allows the flow of the liquid or gas $CO_2$ to pass directly from the canister to the capillary assembly. FIG. 7 represent an exploded view of an upside-down $CO_2$ canister 720 having the identical cross-sectional view as illustrated in FIG. 1A and operated by an electronic solenoid 731 which allows the flow of the $CO_2$ to the capillary assembly 750 which comprehends the same elements as detailed in FIG. 3. When the electronic solenoid 731 is actuated, it presses on the lever linage 734 and 735 illustrated in FIG. 7A, and opens the valve on 720 to allow the flow of $CO_2$. In this variation the valve is electromechanically controlled by an electric current through a solenoid.

FIG. 7A illustrates an exploded view of manifold 730 including a solenoid 731, a preload spring 737, a shaft 732, a plunger 733, a lever hinge pin 734 and an actuator lever 735.

When normally closed, a plunger return spring 737 holds the plunger 733 against the orifice of the $CO_2$ canister, preventing flow through the valve. When the solenoid is energized, a magnetic field is produced, actuating the lever and in turn raising the plunger and allowing flow through the valve.

FIG. 7B is an exploded view of the electronic solenoid comprised of a main coil 740, plunger 733, O-ring 736, and wire leads 737.

FIG. 7C illustrates a cross-sectional view of manifold 730 with outer wall 741, $CO_2$ canister receptacle 732, $CO_2$ chamber 733, solenoid threads 734, shaft cavity 745, lever hinge pin hole 737, and fluid communication outlet 739 which is in communication with the capillary assembly 750 illustrated in FIG. 7.

Multiple solenoid valves can be placed together on a manifold thus reproducing configuration with three $CO_2$ canisters upside-down.

A more common embodiment for the present invention is to use a multiplicity of inverted $CO_2$ cylinders. By way of example, one preferred embodiment is to have three $CO_2$ cylinders. Referring to FIG. 8, there is illustrated the embodiment of the present invention cooling system having a multiplicity of upside down $CO_2$ containers and in this case, three $CO_2$ containers. The embodiment is numbered with the series 800 and represents the fifth variation of the present invention.

Figure 8A:
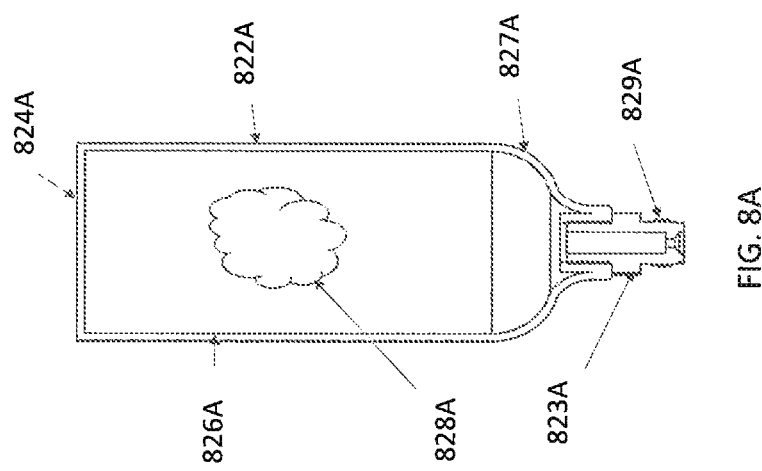
FIG. 8A is a cross-sectional view of FIG. 8 to show the cross-sectional components illustrated in FIG. 1.

FIG. 8A is a cross-sectional view of one of the upside down $CO_2$ containers 820A to illustrate the details of the components. Specifically, cylinder 820A has an exterior wall 822A and a top 824A which surround an interior chamber 826A containing $CO_2$ 828A under pressure. Similarly, as illustrated in the exploded view in FIG. 1A, the bottom of the inverted $CO_2$ cartridge 820A contains a tube 823A surrounded by threads 829A. It will be appreciated that although cross-sectional views of the other two inverted $CO_2$ cylinders are not shown, they have the same internal configuration. Internal $CO_2$ cylinder 820B has an exterior wall 822B and a top 824B which would surround an interior chamber containing $CO_2$ under pressure. Similarly, $CO_2$ container 820C which has an exterior wall 822C and a top 824C which surrounds an interior chamber containing $CO_2$ under pressure. The three $CO_2$ cartridges 824A, 824B and 824C are operated by a manual valve 840 and they are threaded into a manifold block 830 which is connected to a heat exchanger 870. It will be appreciated that although cross-sectional views of the manual valve are not shown, they have the same configuration as illustrated in FIGS. 4 and 4A. A diagram of the heat exchanger is set forth in FIG. 8B and an exploded view of the valves' system for the embodiment with three $CO_2$ cylinders is set forth in FIG. 8C.

Figure 8B:
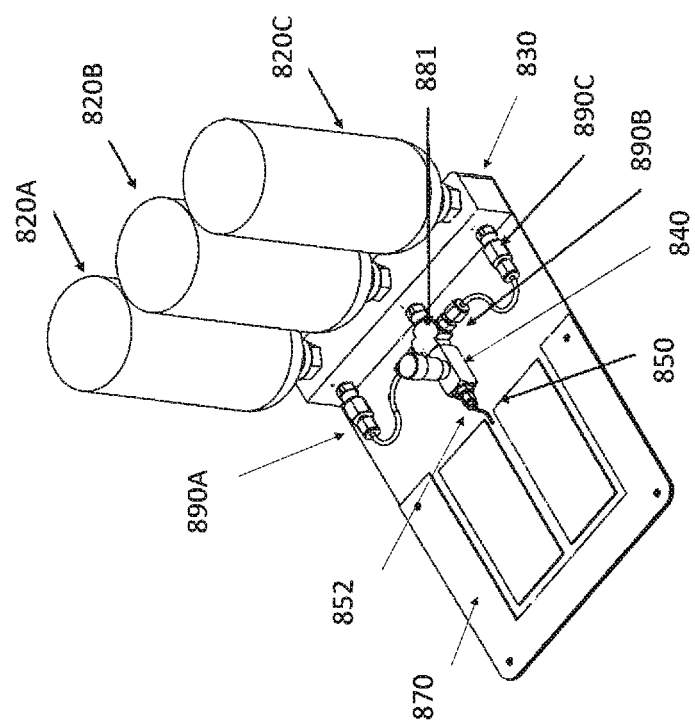
FIG. 8B is a representation of the interior components of the fourth variation illustrated in FIG. 8 with the top plate removed.

In FIGS. 8B and 8C there is illustrated respectively an internal and an exploded view of the embodiment with the three $CO_2$ cylinders 820A, 820B and 820C operated by manual valve 840 without the top plate which is set forth in FIG. 8D and numbered with the series 881. In FIG. 8 there is also illustrated the manifold block 830 having the purpose to connect the three above-mentioned $CO_2$ cylinders to a fluid communication system composed of a manual valve 840, three check valves 890A, 890B and 890C which are fitted into a ⅛" cross fitting member 881 and a capillary tube 850 which has the purpose to convey the liquid or gas $CO_2$ into the heat exchanger 870.

In FIG. 8C there is illustrated an exploded view of the above-mentioned fluid communication system which includes three check valves 890A, 890B and 890C, five connection elements 880A, 880B, 880C, 881 and 892, two connection tubes 891A and 891B and the element 852 in direct connection to the capillary tube 850 which is embedded into the heat exchanger 870.

In FIG. 8D there is illustrated the top plate 871 which is coupled to the main embodiment with screws in the points 871B, 871C, 871D and 871E and through two slots numbered 871F and 871G. The hole 871H is specifically designed to receive the manual valve 840 as illustrated in FIG. 8.

FIG. 8E illustrates a cross sectional view of the ⅛" cross fitting member having four female threads mating 881A, 881B, 881C and 881D where all the other elements of the fluid communication system are connected into.

Figure 8G:
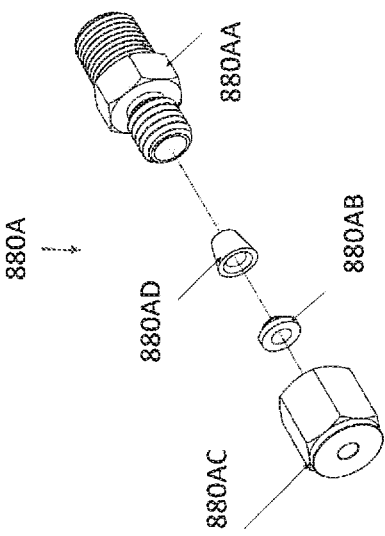
FIG. 8G is an exploded view of the male compression fitting of the check valve.
Figure 8H:
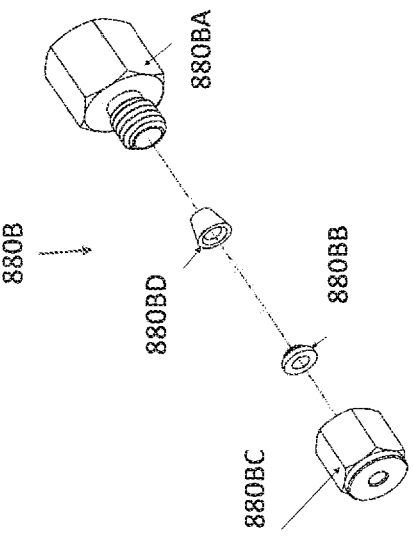
FIG. 8H is an exploded view of the female compression fitting of the check valve.
Figure 8F:
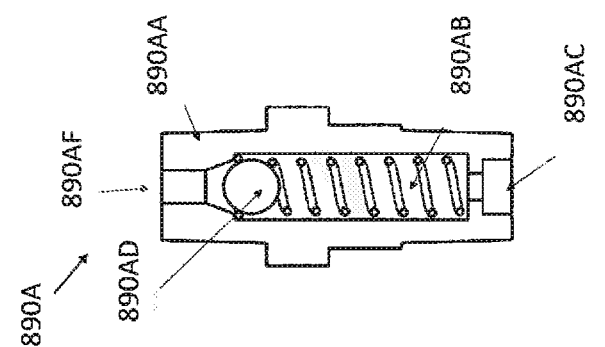
FIG. 8F is a cross sectional view of check valve.

FIG. 8F illustrates a cross sectional view of one check valve 890A. It will be appreciated that although cross-sectional views of the check valves 890B and 890C are not shown, they have the same configuration as illustrated in FIG. 8D. The main body 890AA presents an inlet opening 890AF where the liquid or gas $CO_2$ passes by, goes through the spring 890AB and exits from the outlet 890AC. The ball check in 890AD stops the reverse flow of CO2 if the canister 820 is disconnected from the manifold 830

Referring to FIGS. 8G and 8H there is illustrated an exploded view of respectively a male and a female connection fitting. In FIG. 8G is illustrated one of the two identical male compression fitting 880A, the other one being 880C, which connects the check valve 890A to a tube 891A in communication with the cross fitting member of FIG. 8E through the female compression fitting 880B which is illustrated in the exploded view in FIG. 8H. Both, male and female compression fittings, have connection members, respectively 880AB, 880AC, 880AD in FIG. 8G and 880BA, 880BB and 880BC in FIG. 8H, which are chosen to perfectly fit with the check valves at one end and with the cross fitting member at the opposite end without any kind of leakage.

Referring to FIGS. 9, 9A, 9B and 9C, this illustrates the sixth variation of the invention's cooling system with one complete embodiment operating with an electronic valve in the configuration with three $CO_2$ upside-down cartridges. This variation includes an electronic control as illustrated in FIG. 5D which has a sensor which evaluates the temperature of the cooler and its surrounding to determine what the temperature is and to determine what the required cooling or freezing temperature needs to be achieved. After the electronic control device performs this analysis, the electronic control device electrically opens the electronic valve 940 to release liquid $CO_2$ through a capillary 950 in the heat exchanger plate 970 until a set threshold temperature inside the cooler is achieved. The configuration includes a multiplicity of inverted $CO_2$ cartridges in a manifold block 930 which is affixed to the heat transfer plate 970, and through the manifold block 930, the $CO_2$ cartridges are coupled to the check valves 990A, 990B, 990C which are controlled by the electronic valve 940 which in turn is controlled by the electronic control device 960. Once the electronic control device determines the amount of cooling temperature or freezing temperature required for the specific application, it sends a signal to the electronic control valve 940 to open to permit $CO_2$ from the interior chambers of the cartridges 920A, 920B and 920C to flow through the check valves 990A, 990B, 990C and into the capillary 950 where it is distributed to the location for cooling. The heat transfer plate 970 facilitates the cooling transfer from the capillary to the area to be cooled or frozen. This in effect is the basic principle of the present invention and other variations using different components achieve the same result but different components may be used for different applications.

FIG. 9A is a bottom view of the heat exchanger 970 in the variation with three $CO_2$ cartridges 920A, 920B and 920C. Items 970A and 970B affix the heat exchanger plate 970 to the manifold block 930.

Figure 9B:
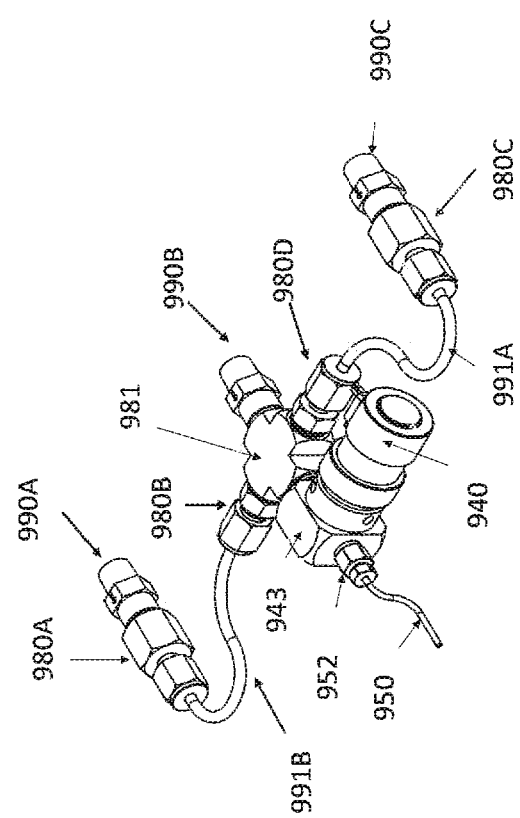
FIG. 9B is a representation of the interior components of the fifth variation illustrated in FIG. 9 with the top plate removed.

FIGS. 9B and 9C illustrate respectively a prospective view and an exploded view of the fluid communication assembly in the sixth variation of the invention's embodiment. The fluid communication system has the same description of FIG. 8A with the only difference represented by the valve which now is an electronic valve 940. The connector member 943 serves as a junction between the manifold block 930 and the capillary unit 950.

Figure 10:
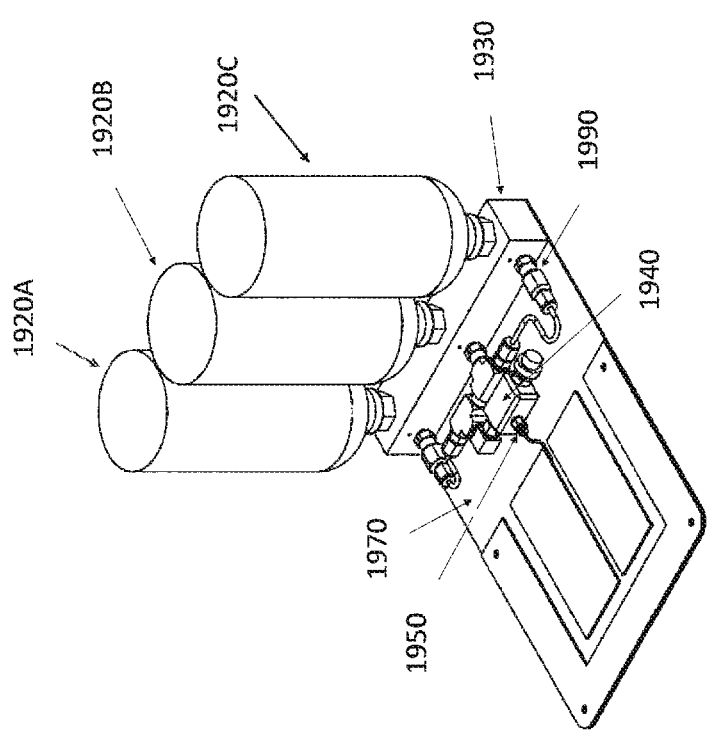
FIG. 10 is a representation of the seventh variation of the invention's cooling system in the configuration with three $CO_2$ canisters and with a release valve which is thermostatically operated.
Figure 10A:
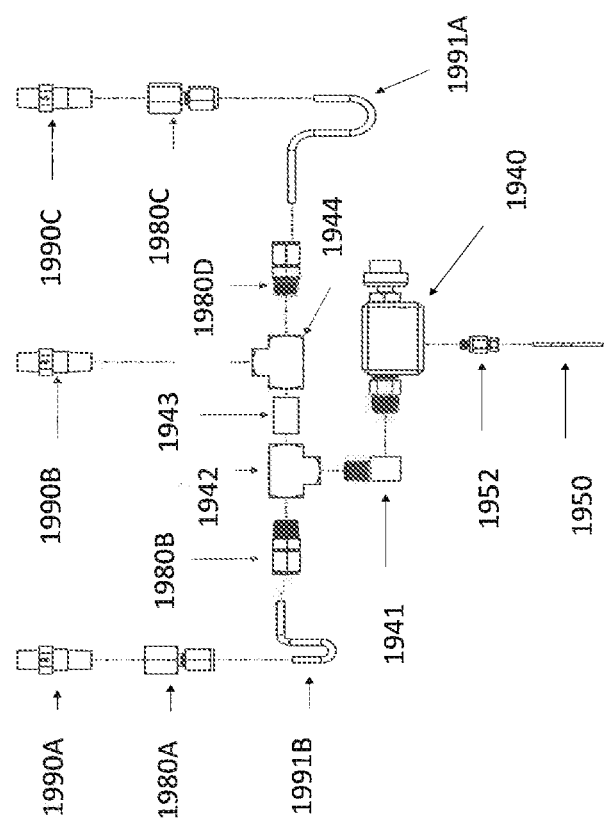
FIG. 10A is an exploded view of the fluid communication assembly of the sixth variation of the invention's cooling system.

FIGS. 10 and 10A are respectively a top perspective view and a fluid communication assembly exploded view of a sixth variation of the present invention which contains the same components described in detail in FIGS. 9, 9B and 9C for the sixth variation of the present invention with the only difference being that instead of having the electronic control 940 to determine how much $CO_2$ needs to be released for the required temperature, that is replaced by a thermostat valve 1940 connected to the fluid communication assembly through the connector members 1942, 1943 and 1944. All of the components are numbered the same with an additional number 1000. For example, instead of each of the cylinders being 920A, the cylinders are now 1920A etc. A polymeric or wax-based thermostatic actuator 1945 is connected to a poppet valve 1940 which releases $CO_2$ through a capillary tube 1950 and into the heat exchanger plate 1970 when the valve is at a predetermined temperature. Wax-based or polymeric thermostatic valves operate by pre-determined temperature. Wax-based or polymeric thermostatic valves operate by exploiting the thermal expansion of wax. As the wax or polymer begins to melt, the wax or polymer expands and opens the valve. As the system begins to cool, the wax or polymer solidifies and closes the valve. The temperature at which the wax or polymer begins to melt is dependent on its formulation and is selected based on its desired operating temperatures. Gas enters through the check valves body 1990A, 1990B and 1990C and then flows through the ⅛"

copper tubing 1991A and 1991B. Then the gas enters the ⅛" NPT T connectors that have female threads on all three entrances 1942 and 1944 and goes into a ⅛" NPT 90 deg fitting with on threaded side male and the other threaded side female 1941 to that the thermostatic poppet valve 1940 attaches to. The gas then goes into the capillary assembly 1952 and finally exits the capillary tube 1950. To attach the copper tubing female compression fittings 1980A and 1980C, and male compression fittings 1980B and 1980D are used. To attach the T connectors together a ⅛" NPT nipple 1943 with male threads on both sides is used.

Referring to FIG. 11 the design assembly of an ice cube tray that can be attached to a $CO_2$ manifold is illustrated. This is the seventh variation of the invention's cooling system. The mechanism which is illustrated in FIG. 11 allows to form ice in a period of time from 1 to 10 minutes. Exploded view of FIG. 11 highlights the units' components and sub-assemblies. $CO_2$ enters into the entrance hose 7950 and is pushed through a female quick disconnect coupler 7951 and male quick disconnect coupler 7952 into an ice tray block 7953 which is attached to the bottom cold disbursement plate 7770 with ice tray block fasteners 7954A and 7954B. The $CO_2$ then enters the capillary assembly 7500 and exits the capillary tube 7501 into the bottom cold disbursement plate 7770. The cold is then dispersed through the water containment tray 7760 and into the water divider 7780 which will be full of water. The plate assembly is fastened together by the ice tray bottom plate fasteners 7772.

FIG. 11A illustrates an exploded view of the capillary assembly 7500. $CO_2$ enters the capillary tube female fitting 7504 and then enters the capillary tube 7501. To hold the capillary tube in place a capillary tube flare fitting 7503 is used and the capillary tube male fitting 7502 is used to compress the flare and hold it in place.

FIG. 11B illustrates a cross section 7900 of the block used for the ice tray design. Gas enters the ⅛" NPT female thread for fitting 7558 and then exits the 10-32 female thread for capillary attachment 7559. The capillary assemble could not be put on without making a cut out for socket to attach capillary assembly 7955 in order to reduce the overall length. The ice tray block housing 7956 is attached through the ice tray block bolt holes 7957A and 7957B.

Figure 11C:
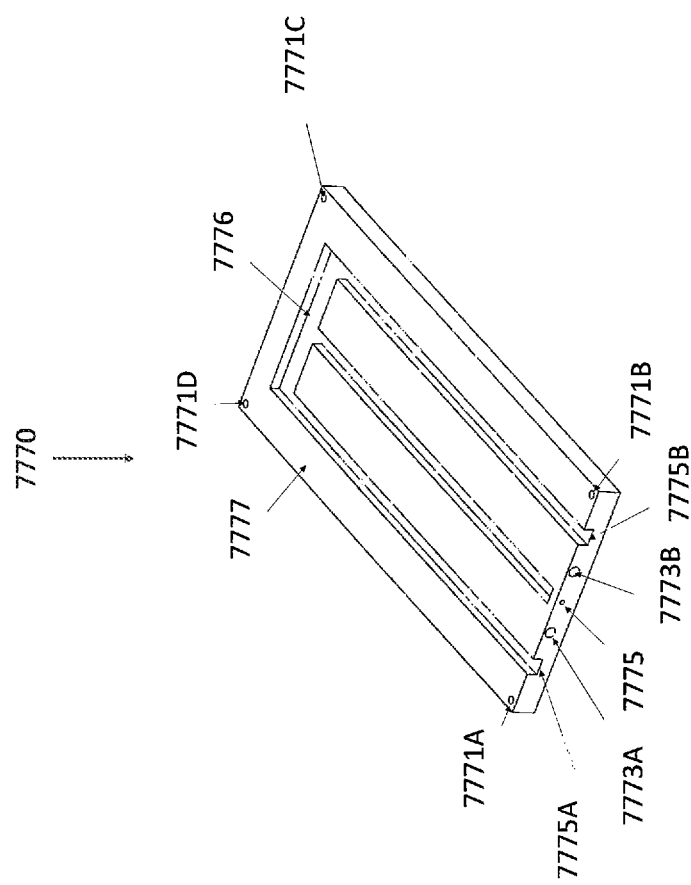
FIG. 11C is a prospective view of the heat exchanger used in the ice making accessory mechanism.

FIG. 11C represents an overall view of the cold disbursement plate 7770. Gas enters through the cold disbursement plate capillary inlet hole 7774 and flows through the cold disbursement plate gas flow channel 7776. The gas then exits through the exit holes 7775. To attach the block, two threaded block fastener holes 7773A, 7773B are included to attach the water tray 760, items 7771A, 7771B, 7771C and 7771D are included. The cold is then dispersed through the water containment tray 7760. For labeling purposes the top of the cold disbursement plate is 7777.

FIG. 11D illustrates an overall view of the water containment tray 7760. As the cold disbursement plate 7770 of FIG. 11C is cooling, the first thing that cools is the water containment tray bottom 7762. As the cold transfers through the containment tray the water containment tray front 7761 and the water containment tray side 7763 also cool.

FIG. 11E represents a water divider 7780. As the water containment tray cools, water divider mating side to the water containment tray 7782 cools first and then the water divider side that separates the water 7783 cools and finally the water divider top 7781 gets cold. The overall freezing process takes from 1 to 10 minutes in total.

Figure 12:
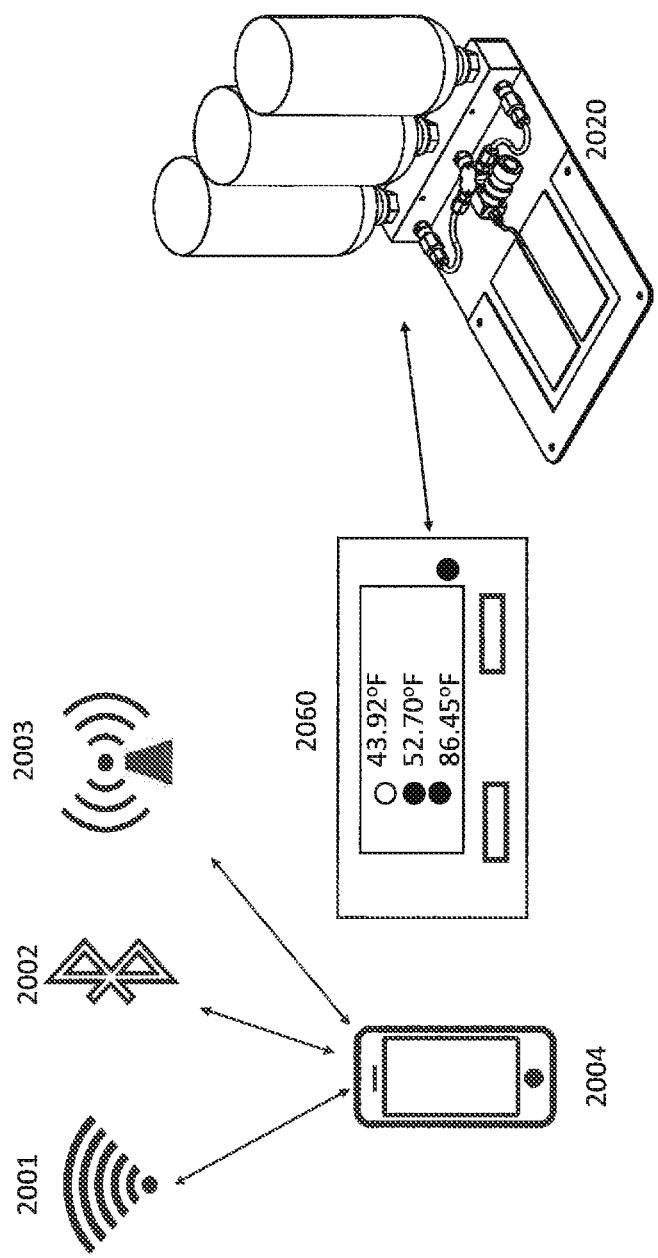
FIG. 12 is a representation of the present invention's cooling system communicating with a smartphone device through Wifi, Bluetooth or Radio-Frequency communication.

Referring to FIG. 12, there is illustrated the representation of data communication between a smartphone 2004 and the electronic control device 2060 which controls the invention's cooling system 2020 via WiFi 2001, Bluetooth 2002 or Radio Frequency 2003 transmission. The communication is handled by the control software as described in FIG. 5E.

Figure 13:
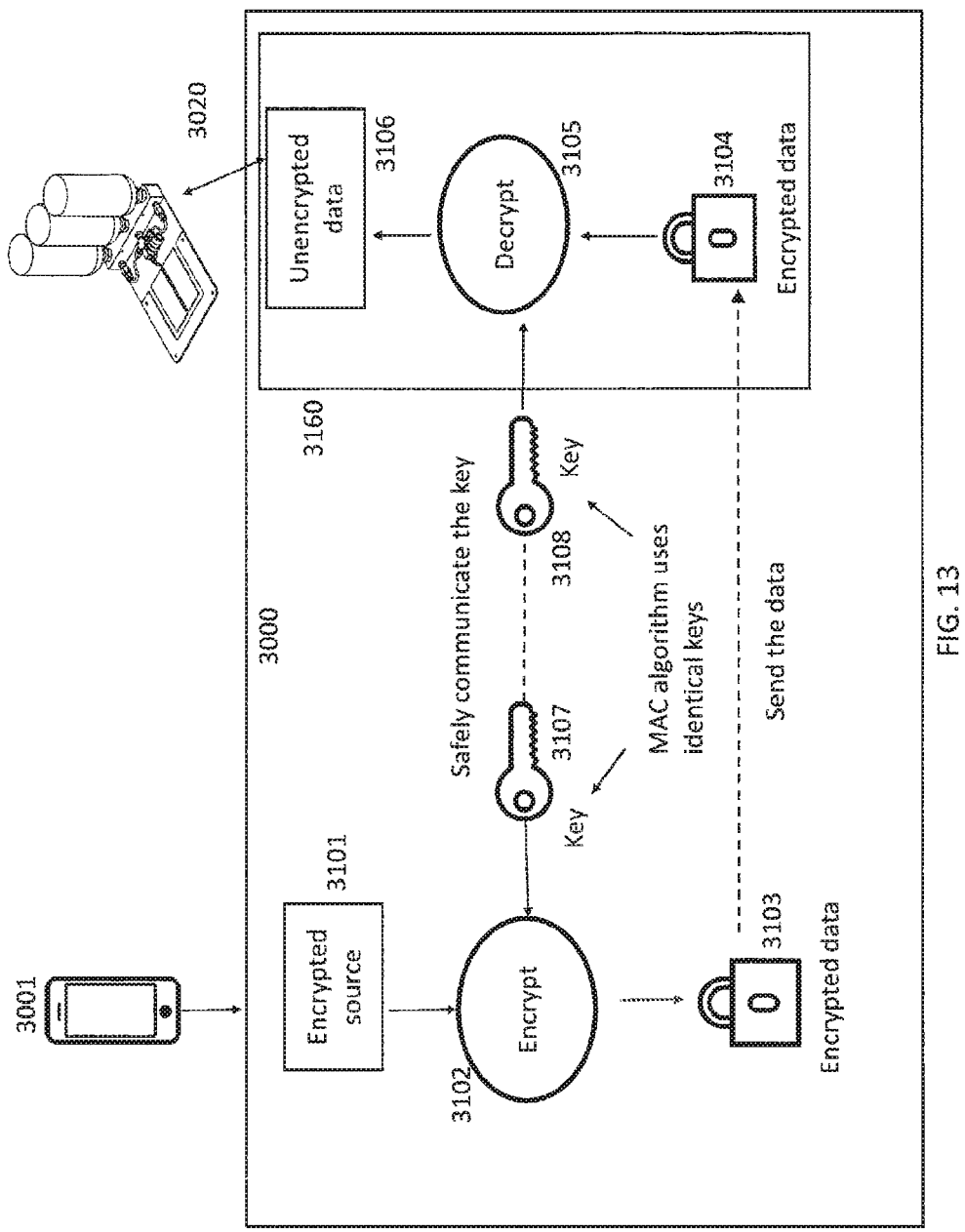
FIG. 13 is a representation of the present invention's cooling system communicating with a smartphone device through Wifi, Bluetooth or Radio-Frequency communication using encrypted algorithm.

Referring to FIG. 13, there is illustrated the representation of data encryption method 3000 between a smartphone 3001 and the electronic control device 3160 which controls the invention's cooling system 3020. To encrypt the transmitted data a message authentication code (MAC) method will be used with identical keys 3107 and 3108. The encryption software is included in the app, data are encrypted 3102, sent over the air using a transmission method as described in FIG. 12. The electronic control software running on electronic control device 3160 will receive encrypted data 3104 and decrypt them 3105 using the MAC algorithm and utilizes the received data to operates the invention's control unit 3020.

Figure 14:
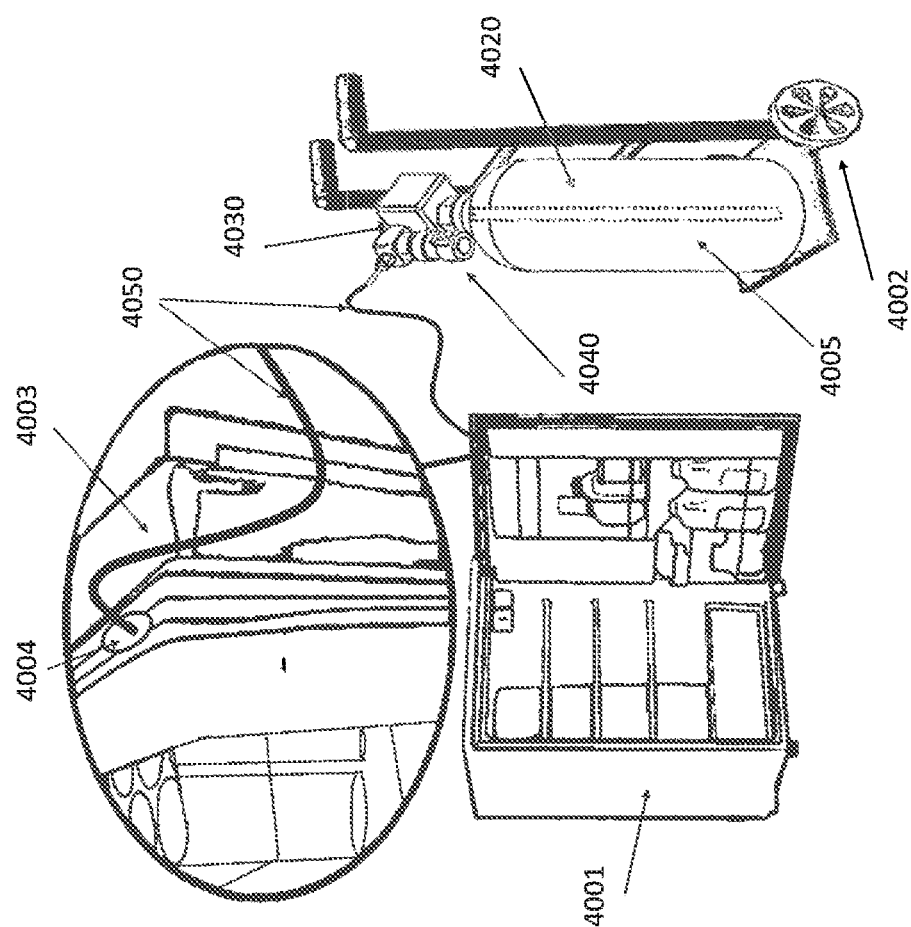
FIG. 14 is a representative example of the use of the present invention cooling system to refrigerate a unit.

FIG. 14 represents the application of the invention's cooling system to a refrigerator unit 4001 which can be used in case of power supply outage of the main power supply. The liquid or gaseous $CO_2$ container 4020 (can be 1, 2.5, 5, 10, 20, 50, or 75 lb portable compressed/liquefied gas cylinders) is placed in up-right position on a transporter equipped with wheel 4002 which is commercially available. The liquid or gaseous $CO_2$ is released through a syphon tube 4005 flowing into a release valve 4040 which can be electronic or manual or thermostat and through an additional capillary tube 4050 which is connected to a refrigerator unit through a hole 4004 in the refrigerator gasket 4003. The release mechanism of the $CO_2$ is the same as described in FIGS. 1 and 2 if manual valve is used, in FIG. 5 if electronic valve is used and in FIG. 6 if thermostat valve is used.

Figure 15:
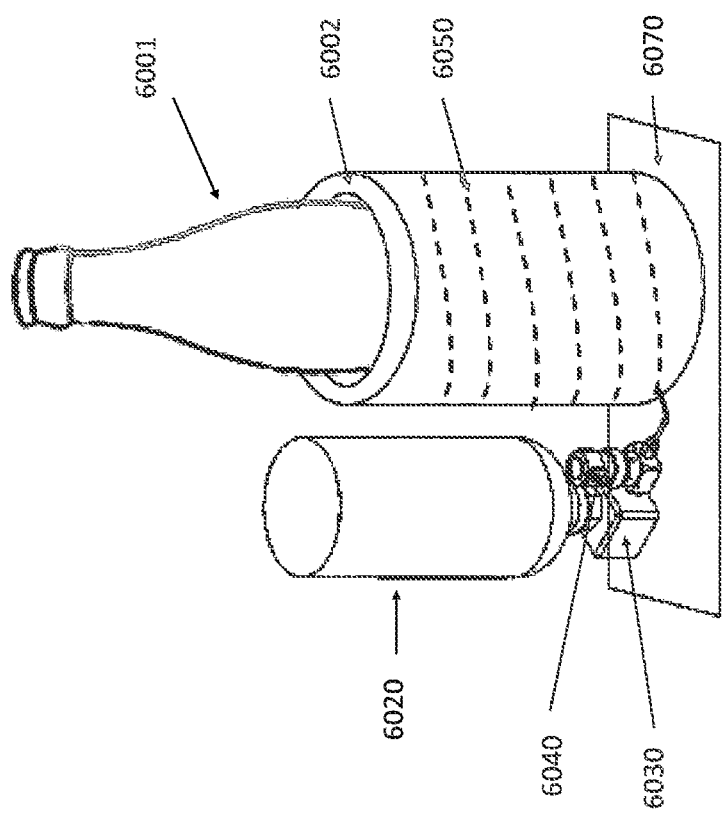
FIG. 15 is a representation of the application of the invention's cooling system to portable individual containers for beverages such as cans or bottles, expressed breast milk or other beverages or foods or items that need to be cooled or to be maintained at a controlled temperature.

In FIG. 15 is represented the application of the invention's cooling system to refrigerate, cool or freeze an individual item 6001 where a small cylinder of liquid or gaseous $CO_2$ 6020 i.e. 12g disposable metal canister (soda fountain cartridge) and a coolant chamber 6002 with the capillary tube(s) 6050 wrapped around the cooling chamber 6002 are utilized. The small cylinder 6020 is affixed to a manifold block 6030 and releases liquid or gaseous $CO_2$ to a release valve 6040 which can be which can be electronic or manual or thermostat. The release mechanism of the $CO_2$ is the same as described in FIGS. 1 and 2 if manual valve is used, in FIG. 5 if electronic valve is used, in FIG. 6 if thermostat valve is used and in FIG. 7 if electronic solenoid is used.

Figure 16:
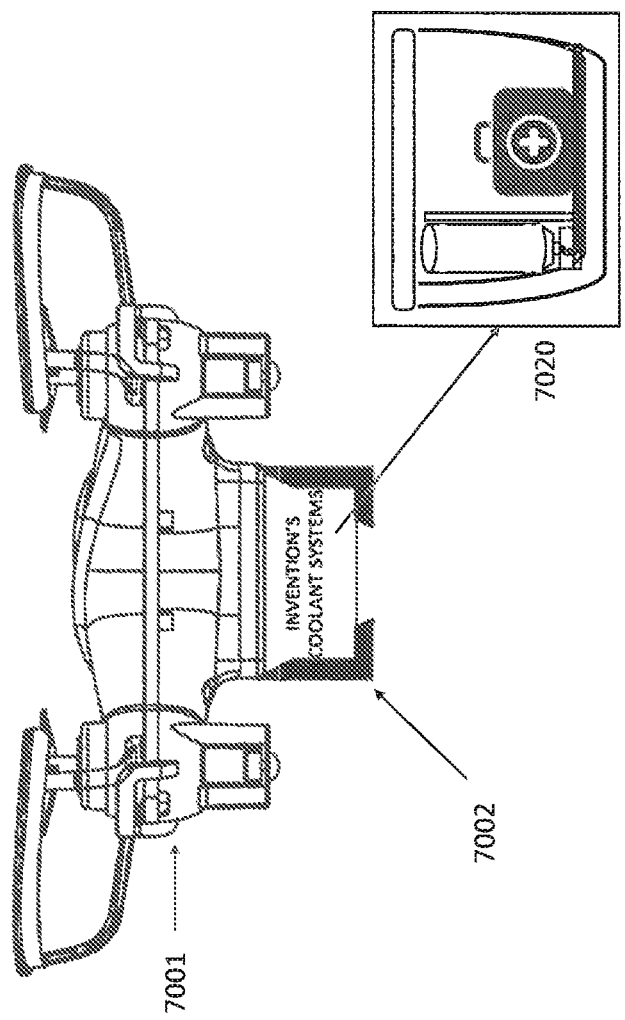
FIG. 16 is a representation of the application of the present invention cooling system to items which need to be maintained refrigerated, cooled, or frozen and need to be transported using a small unmanned aerial vehicle also called drones.

In FIG. 16 is represented the application of the invention's cooling system to a refrigeration unit transported by a Small Unmanned Aerial Vehicles (SUAVs, also called "Drones") 7021. The invention's cooling system 7020 having a small $CO_2$ cartridge i.e. 12 g disposable metal canister (soda fountain cartridge) 7020 similar to the one described in FIG. 15. The invention's cooling system is protected in an insulated or non-insulated box which is fixed with screws on a base 7002 attached to the drone.

Referring to FIG. 17, there is illustrated the representation of a cooler 8000 with the invention's cooling unit embedded in. The cooler has a top upper lid 8102 and a top lower lid 8104 containing insulated material 8103 in between. Same insulated material 8103 is placed between the inner lateral wall 8106 and external lateral wall 8108 and between the bottom external wall 8112 and bottom internal wall 8110. On one of the lateral wall the electronic control device 8160 is placed on. The said electronic control device is wired in connection 8109 with the invention's cooling unit 8100 having 3 upside-down $CO_2$ canisters 8120, a capillary tube 8150, a heat exchanger 8170 and a manifold block 8130 to screw into the $CO_2$ canisters. An internal wall 8180 with the function of a separator between the invention's cooling unit and the compartment for beverages and food is also illustrated.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A liquid and/or gas cooling system, comprising:
   a. at least one compressed liquid and/or gas $CO_2$ container;
   b. a $CO_2$ refrigerant retained within an interior chamber surrounded by a circumferential sidewall and top of each of said at least one compressed liquid and/or gas $CO_2$ container;
   c. a heat transfer plate having at least an upper surface;
   d. a manifold block affixed to said upper surface of said heat transfer plate, the manifold block having a body adjacent to an end of the heat transfer plate, female mating threads, and
   e. said at least one $CO_2$ compressed liquid and/or gas container having a member in fluid communication with said interior chamber of said at least one compressed liquid and/or gas $CO_2$ container, the member having a circumferential sidewall with mating male threads, the at least one compressed liquid and/or gas $CO_2$ container placed in an inverted condition with the male mating threads engaged with and threaded onto the female mating threads so that the at least one compressed liquid container is retained in an inverted condition in the at least one opening of the manifold block;
   f. at least one check valve between the manifold block and the retained at least one compressed liquid and/or gas $CO_2$ container, the at least one check valve connected to at least one releasing valve releasing compressed liquid and/or gas $CO_2$ to a capillary tube embedded in the heat transfer plate; and
   g. the at least one releasing valve as part of a metering $CO_2$ control releasing system, which is controlled or actuated selected from the group consisting of manually, electromechanically, electronically or thermostatically, to release liquid and/or gas $CO_2$ from at least one compressed liquid and/or gas $CO_2$ container into the cooling system, the at least one releasing valve metering and controlling the release of compressed liquid and/or gas $CO_2$ from the at least one compressed liquid and/or gas $CO_2$ container.

2. The system as described in claim 1, further comprising:
   a. the manifold block with at least one opening having the female mating threads on a surface where the male mating male threads of the at least one compressed liquid and/or gas $CO_2$ container is screwed into;
   b. said manifold block having an internal cavity where the compressed liquid and/or gas $CO_2$ is conveyed once released; and
   c. said internal cavity is in connection with the at least one capillary tube embedded into the heat transfer plate.

3. The system as described in claim 1, further comprising:
   a. the heat transfer plate is utilized, the heat transfer plate made of a material having the capability of transferring heat through its surface and containing embedded capillary tube(s) where the compressed liquid and/or gas $CO_2$ is released by the at least one releasing valve (either electronic or thermostatic or manual or electromechanical) into the capillary tube(s); and
   b. the controlled reduction and steady maintenance of temperature along the heat transfer plate allows items to be maintained refrigerated, cooled or frozen.

4. The system as described in claim 1, further comprising:
   a. the one or more capillary tube(s) with various widths and lengths are embedded in the heat transfer plate or wrapped around a cooling chamber designed to refrigerate, cool or freeze beverages including cans, bottles or other small items in need of refrigeration, cooling or freezing;
   b. the various widths and lengths of the capillary tube(s) allow an operator to manually regulate, change or control the flow of compressed liquid and/or gas $CO_2$ thus acting on the temperature setting and on the quantity of compressed liquid and/or gas $CO_2$ to be released for a more efficient utilization of the heat transfer plate; and
   c. the capillary tube(s) convey the compressed liquid and/or gas $CO_2$ along the heat transfer plate, the capillary tube(s) having filters to avoid any freezing, clogging or blocking of the compressed liquid and/or gas $CO_2$ flow, the capillary tubes(s) convey the compressed liquid and/or gas $CO_2$ to be safely released from the compressed liquid and/or gas $CO_2$ container(s) in the heat transfer plate, thereby avoiding the compressed liquid and/or gas $CO_2$ to be directly spilled on the items in need of refrigeration.

5. The system as described in claim 1, further comprising: the at least one releasing valve functioning as a manual valve control for the purpose of opening and releasing compressed liquid and/or gas $CO_2$ into the capillary tube(s) embedded in the heat transfer plate when deemed necessary by a user.

6. The system as described in claim 1, further comprising:
   a. an electronic control device including a transmittal member to transmit encrypted commands to said electronic control device and when a desired cooling temperature is determined, the electronic control device opens the at least one releasing valve, and compressed liquid and/or gas $CO_2$ are dispensed through the at least one dispensing valve through the capillary tube(s) embedded in the heat transfer plate with the heat transfer plate providing the cooling temperature to a selected location; and
   b. at least an electronic $CO_2$ member functioning as an electronic valve control for the purpose of evaluating the temperature of a cooler and its surroundings and electrically open and release compressed liquid and/or gas $CO_2$ into the capillary tube(s) embedded in the heat transfer plate until a set threshold temperature inside the cooler is achieved for a desired period(s) and length(s) of time.

7. The system as described in claim 1, further comprising:
   a. an electronic control device including a transmittal member to transmit encrypted commands to said electronic control device, and when a desired cooling temperature is determined, the electronic control device opens the at least one releasing valve, and compressed liquid and/or gas $CO_2$ are dispensed through the at least one releasing valve through the capillary tube(s) embedded in the heat transfer plate with the heat transfer plate providing the cooling temperature to a selected location;

b. at least one electronic solenoid member included into the manifold block and functioning as a valve controller for the purpose of controlling the flow of liquid and/or gas $CO_2$ into the one or more capillary tubes embedded in the heat transfer plate when deemed necessary by the user;

c. when the solenoid is energized, a magnetic field is produced actuating a lever contained in the manifold block which in turn raises a plunger allowing flow of compressed liquid and/or gas $CO_2$ through the at least one releasing valve; and d. the solenoid $CO_2$ valve control remains activated for various times to control the flow of compressed liquid and/or gas $CO_2$ depending on a desired temperature and/or a desired period(s) and length(s) of time required or needed.

8. The system as described in claim 1, further comprising:

a. at least a thermostatic $CO_2$ member functioning as the at least one releasing valve controlling the temperature from −78° C. to ambient external temperature to the at least one compressed liquid and/or gas container;

b. the thermostatic $CO_2$ member is a polymeric/wax-based thermostatic valve which operates by exploiting the thermal expansion of a mixture of polymer/wax components;

c. as the polymer/wax mixture begins to melt, the material expands and opens the wax-based thermostatic valve;

d. as the system begins to cool, the material contracts and solidifies which allows the wax-based thermostatic valve to close;

e. the temperature at which the polymer/wax begins to melt is dependent on its formulation and is selected based on its desired operating temperatures; and f. when the desired operating temperatures are reached, the wax-based thermostatic valve closes for a period of time until an operating temperature exceeds a desired operating temperature, then the wax-based thermostatic valve opens.

9. The system as described in claim 1, further comprising:

a. the at least one check valve placed between the compressed liquid and/or gas $CO_2$ container's manifold block and the manifold block joining two or more compressed liquid and/or gas $CO_2$ containers;

b. the at least one check valve avoids compressed liquid and/or gas $CO_2$ from escaping when removing or replacing $CO_2$ containers individually; and c. the at least one check valve enables efficient utilization of one or more than one compressed liquid and/or gas $CO_2$ containers.

10. The system as described in claim 6, further comprising: the electronic control device including:

a. a display where the following temperatures are visualized: i) external to the cooler; ii) internal into the cooler; and iii) at the upper surface of the heat exchanger;

b. an electronic board for checking the current temperatures and sending the desired temperatures to the at least one releasing valve;

c. a wired electronic connection to the cooler;

d. a USB port;

e. a power supply component;

f. a Bluetooth component;

g. a WiFi component;

h. a radio frequency component; and i. a case-box containing at least one of the electronic board and connection to the cooler, the USB port, the power supply component, a Bluetooth component, a WiFi component, and a Radio Frequency component, collectively defined as one or more of the electronic components, with an input and an output having a display on a surface of the cooler.

11. The system as described in claim 10 further comprising: the electronic control device is powered by a battery.

12. The system as described in claim 11 further comprising: the battery is chargeable via a USB port.

13. The system as described in claim 11 further comprising: the battery is chargeable via a 12V DC automotive connection.

14. The system as described in claim 11 further comprising: the battery is chargeable via a 120V AC connection.

15. The system as described in claim 11 further comprising: the battery is powered via a solar panel.

16. The control system as described in claim 10 further comprising: the encrypted commands are transmitted from the electronic control device in the cooler through Wi-Fi/Bluetooth/Radio Frequencies to a smartphone or tablet or a server encrypted to avoid spoofing, intrusion, interference, meaconing, jamming or data falsification.

17. The system as described in claim 10 further comprising: the desired temperature and its length of time are remotely controllable.

18. The system as described in claim 10 further comprising: alerts are communicated using Bluetooth or Wi-Fi technologies to a mobile phone or email account, or sound, buzzer or vibration for notifying an operator of the system for:

a. temperature of items, at the top and at the bottom of cooler as well as the ambient temperature outside the cooler equipped with the system out of acceptable limits for determined acceptable periods and lengths of time, b. liquid and/or gas $CO_2$ level low, c. battery level low; and d. air pressure status.

19. The system as described in claim 1 further comprising: the at least one compressed liquid and/or gas $CO_2$ container positioned in an upright position.

20. The system as described in claim 1 further comprising: the at least one compressed liquid and/or $CO_2$ container positioned in an upside-down position.

21. The system as described in claim 1 further comprising:

a. an embodiment of the system used for back up refrigeration in the event of primary refrigeration cycle failure including:

i. for residential/commercial use (backup to a compressor based refrigeration cycle); and ii. for recreational use (backup to a thermoelectric cooler as the primary cycle).

22. The system as described in claim 1 further comprising: the system is integrated into a vehicle for food delivery.

23. The system as described in claim 1 further comprising: the system is integrated into a vehicle for food storage.

24. The system as described in claim 1 further comprising:

a. the system is designed for a container for personal medical storage including insulin;

b. the system further comprises an insulated plastic, composite or metal container with either traditional or vacuum insulation; and c. the container and control mechanism of the system contained.

25. The system as described in claim 1 further comprising: the system is designed for critical refrigeration of medical materials including vaccines and drugs.

26. The system as described in claim 1 further comprising: the system is designed to receive food, beverages, medical supplies, blood, temperature sensitive chemicals and pharmaceuticals, prey resulting from fishing or hunting activities or perishable items in need of refrigeration, cooling or freezing deliveries when the owner, renter or resident of a residential dwelling (i.e.: houses, apartments, dormitories or town-houses) is not present.

27. The at least one compressed liquid and/or gas CO2 container as described in claim 1 is selected from the group consisting of:
   a. 12 g disposable metal canister (soda fountain cartridge),
   b. 12, 16, 20, 24, 32 oz metal or composite cylinder (paint ball cylinders),
   c. 1, 2.5, 5, 10, 20 lb portable compressed gas cylinders,
   d. >20 lb semiportable/bulk compressed gas cylinders,
   e. large volume liquid containers, and
   f. a specially designed compressed liquid container specific for the invention's cooling system and a custom manifold block where the $CO_2$ container(s) can be screwed into or connected to form a seal between the $CO_2$ container(s) and the manifold block that prevents the liquid and the gas $CO_2$ from escaping and prevents the leakage of the liquid or the gas $CO_2$.

28. The electronic control device as described in claim 10 further comprising: the system is integrated with wireless or hard wire transmission technology selected from the group consisting of:
   a. bluetooth connection to a phone or computer, or tablet;
   b. Wi-Fi for connection to a phone, tablet, or computer;
   c. radio frequency, and
   d. hard wire transmission utilizing a hard wire connection for areas where there is high environmental interference of the wireless transmission.

29. The control system as described in claim 28 further comprising:
   the data transmitted from the electronic control device of the system via Wi-Fi/Bluetooth/radio frequencies to a smartphone or tablet or a server encrypted to avoid spoofing, intrusion, interference, meaconing, jamming or data falsification.

30. The system as described in claim 28 further comprising: desired temperature and its length of time are remotely controllable.

31. The system as described in claim 28 further comprising: alerts are communicated using Bluetooth or Wi-Fi technologies to a mobile phone or email account, or sound, buzzer or vibration for notifying the operator of the invention's cooling system for:
   a. temperature of items, at the top and at the bottom of the vessels as well as the ambient temperature outside the vessel equipped with the invention's cooling system out of acceptable limits for determined acceptable periods and lengths of time,
   b. liquid and/or gas $CO_2$ level low,
   c. battery level low, and
   d. air pressure status.

32. The system as described in claim 7, further comprising: the electronic control device including:
   a. a display where the following temperatures are visualized: i) external to the cooler; ii) internal into the cooler; and iii) at the upper surface of the heat exchanger;
   b. an electronic board for checking the current temperatures and sending the desired temperatures to the electronic valve;
   c. a wired electronic connection to the cooling system;
   d. a USB port;
   e. a power supply component;
   f. a Bluetooth component;
   g. a WiFi component;
   h. a radio frequency component; and
   i. a case-box containing electronic components with input and output connectors and having the display in one of its surface.

33. The system as described in claim 32 further comprising: the electronic control device is powered by a battery.

34. The system as described in claim 33 further comprising: the battery is chargeable via a USB port.

35. The system as described in claim 33 further comprising: the battery is chargeable via a 12V DC automotive connection.

36. The system as described in claim 33 further comprising: the battery is chargeable via a 120V AC connection.

37. The system as described in claim 33 further comprising: the battery is powered via a solar panel.

38. The control system as described in claim 33 further comprising:
   the data transmitted from the electronic control device of the system via Wi-Fi/Bluetooth/Radio Frequencies to a smartphone or tablet or a server is encrypted to avoid spoofing, intrusion, interference, meaconing, jamming or data falsification.

39. The system as described in claim 33 further comprising:
   desired temperature and its length of time are remotely controllable.

40. The system as described in claim 33 further comprising: alerts are communicated using Bluetooth or Wi-Fi technologies to a mobile phone or email account, or sound, buzzer or vibration for notifying the operator of the invention's cooling system for:
   a. temperature of items, at the top and at the bottom of the vessels as well as the ambient temperature outside the vessel equipped with the invention's cooling system out of acceptable limits for determined acceptable periods and lengths of time;
   b. liquid and/or gas $CO_2$ level low;
   c. battery level low; and
   d. air pressure status.

41. The electronic control device as described in claim 33 further comprising: the system is integrated with wireless or hard wire transmission technology selected from the group consisting of:
   a. bluetooth connection to a phone or computer or tablet;
   b. Wi-Fi for connection to a phone, tablet or computer;
   c. radio frequency, and
   d. hard wire transmission utilizing a hard wire connection for areas where there is high environmental interference of the wireless transmission.

42. The control system as described in claim 41 further comprising:
   the data transmitted from the electronic control device of the system via Wi-Fi/Bluetooth/radio frequencies to a smartphone or tablet or a server is encrypted to avoid spoofing, intrusion, interference, meaconing, jamming or data falsification.

43. The system as described in claim 41 further comprising:
   desired temperature and its length of time are remotely controllable.

44. The system as described in claim 41 further comprising: alerts are communicated using Bluetooth or Wi-Fi technologies to a mobile phone or email account, or sound, buzzer or vibration for notifying the operator of the invention's cooling system for:
   a. temperature of items, at the top and at the bottom of the vessels as well as the ambient temperature outside the vessel equipped with the invention's cooling system out of acceptable limits for determined acceptable periods and lengths of time,
   b. liquid and/or gas $CO_2$ level low,
   c. battery level low; and
   d. air pressure status.

* * * * *